US012246830B1

(12) United States Patent
Page et al.

(10) Patent No.: US 12,246,830 B1
(45) Date of Patent: Mar. 11, 2025

(54) MODULAR BLENDED WING BODY (BWB) AIRCRAFT AND METHOD OF MANUFACTURE

(71) Applicant: JETZERO, INC., Long Beach, CA (US)

(72) Inventors: Mark Allan Page, Long Beach, CA (US); Blaine Knight Rawdon, Long Beach, CA (US); Raphael Diaz, Long Beach, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 18/244,049

(22) Filed: Sep. 8, 2023

(51) Int. Cl.
*B64C 39/10* (2006.01)

(52) U.S. Cl.
CPC ........ *B64C 39/10* (2013.01); *B64C 2039/105* (2013.01); *B64C 2211/00* (2013.01)

(58) Field of Classification Search
CPC ............... B64C 2211/00; B64C 2039/105
USPC .......................................................... 244/120
See application file for complete search history.

(56) References Cited

U.S. PATENT DOCUMENTS

| | | | | |
|---|---|---|---|---|
| 4,736,910 A * | 4/1988 | O'Quinn | ................. | B64C 1/069 244/120 |
| 5,909,858 A * | 6/1999 | Hawley | ..................... | B64C 3/00 244/45 R |
| 6,065,720 A * | 5/2000 | Ash | .......................... | B64F 5/10 244/120 |
| 6,070,831 A * | 6/2000 | Vassiliev | ................. | B64C 39/12 244/119 |
| 6,568,632 B2 * | 5/2003 | Page | ...................... | B64C 1/0009 244/36 |
| 6,708,924 B2 * | 3/2004 | Page | ...................... | B64U 10/20 244/36 |
| 6,926,235 B2 * | 8/2005 | Ouellette | .............. | B64C 39/024 244/119 |
| 10,988,232 B2 * | 4/2021 | Crawford | ............... | B64D 33/00 |
| 11,124,283 B1 * | 9/2021 | Kennedy | ................. | B64C 35/00 |
| 11,511,854 B2 * | 11/2022 | Baity | ..................... | B64U 30/10 |
| 11,541,576 B1 | 1/2023 | Page | | |

(Continued)

FOREIGN PATENT DOCUMENTS

FR 3048226 A1 * 9/2017 ............. B64C 39/10
FR 3048226 B1 7/2019

(Continued)

*Primary Examiner* — Christopher P Ellis
(74) *Attorney, Agent, or Firm* — Caldwell Intellectual Property Law

(57) ABSTRACT

A modular blended wing body (BWB) aircraft includes common components containing a nose structure having a left aft edge and a right aft edge intersecting on a centerline of the BWB on one end and intersecting on a leading edge of the BWB on another end, and two wing structures attached to the nose structure, wherein the at least two rear structures includes a left-wing structure arranged on the left side of the centerline, wherein the left-wing structure includes a left forward edge, and a right-wing structure arranged on the right side of the centerline, wherein the right-wing structure includes a right forward edge, and wherein the left-wing structure and the right-wing structure are laterally symmetrical to the centerline, and wherein there is no clear demarcation between the at least two wing structures and the nose structure of the plurality of common components of the BWB aircraft.

20 Claims, 15 Drawing Sheets

(56) References Cited

U.S. PATENT DOCUMENTS

| | | | |
|---|---|---|---|
| 11,613,356 B2* | 3/2023 | Banerjee | B64C 1/0009 |
| | | | 244/36 |
| 2012/0091257 A1* | 4/2012 | Wolff | B64U 10/20 |
| | | | 244/12.4 |
| 2018/0057136 A1* | 3/2018 | Haley | A63H 27/001 |
| 2019/0135424 A1* | 5/2019 | Baity | B64C 39/10 |
| 2019/0161185 A1* | 5/2019 | Woodworth | B64C 39/024 |
| 2019/0374868 A1* | 12/2019 | Russell | A63H 33/12 |
| 2020/0115031 A1* | 4/2020 | Evans | B64C 3/26 |
| 2020/0172236 A1* | 6/2020 | George | B64F 1/362 |
| 2020/0180760 A1* | 6/2020 | Richardson | B64F 5/00 |
| 2021/0197965 A1* | 7/2021 | Kunz | B64U 10/10 |
| 2021/0269150 A1* | 9/2021 | Xiong | B64C 1/00 |
| 2022/0355932 A1* | 11/2022 | Abramov | B64D 5/00 |
| 2023/0092771 A1 | 3/2023 | Page | |
| 2023/0211245 A1* | 7/2023 | Feng | A63H 30/04 |
| | | | 244/120 |

FOREIGN PATENT DOCUMENTS

| | | | | |
|---|---|---|---|---|
| GB | 2555441 A * | 5/2018 | | B64C 1/069 |
| WO | WO-2011011089 A1 * | 1/2011 | | B64C 3/56 |

* cited by examiner

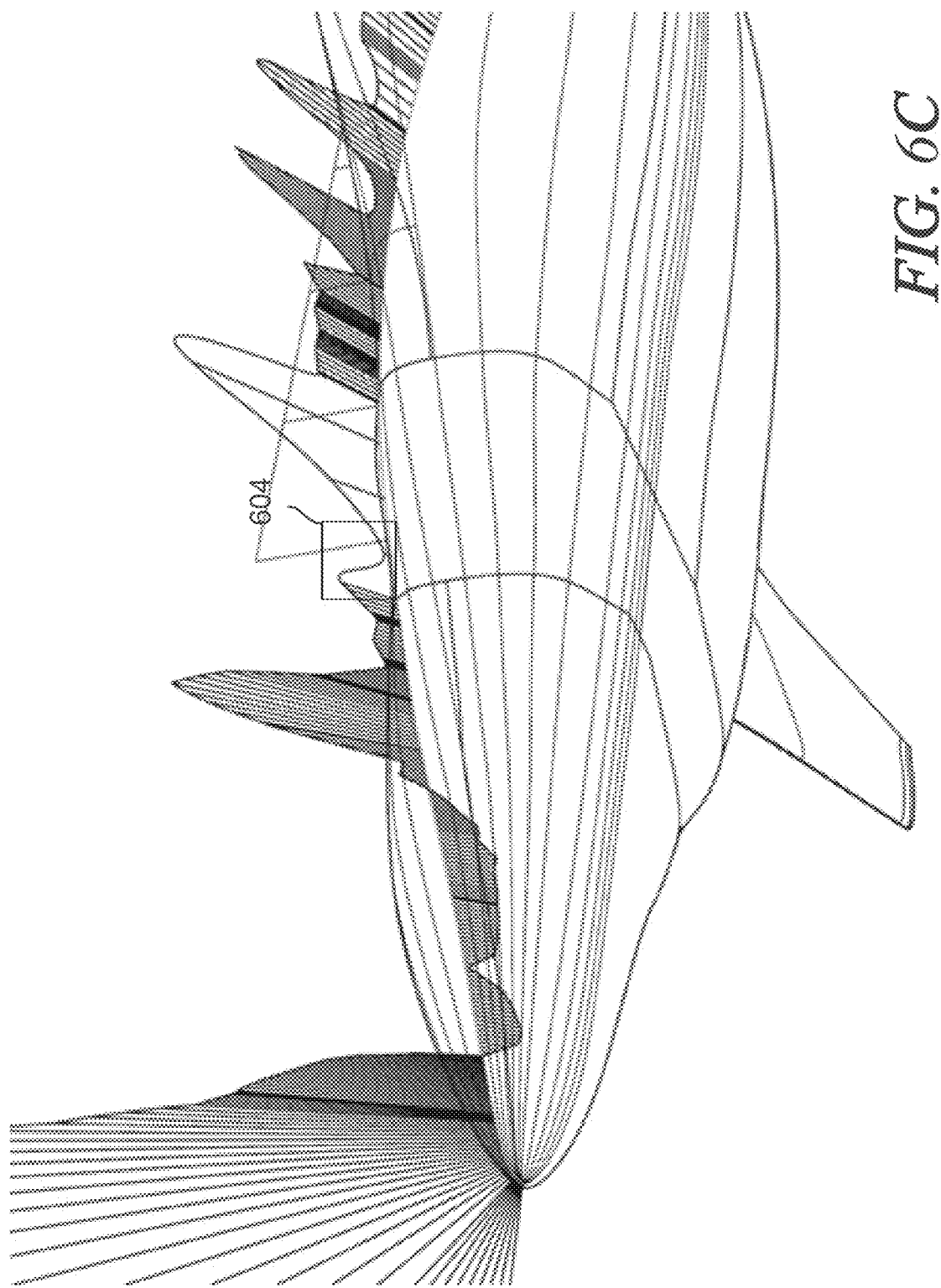

700 ⇘

705 — Receiving a Plurality of Common Components Containing a Nose Structure having a Left Aft Edge and a Right Aft Edge Intersecting on a Centerline of the BWB on one end and Intersecting on a Leading Edge of the BWB on another end, and at least two Wing Structures having a Left Wing Structure and a Right Wing Structure, wherein the at least two Wing Structures are Laterally Symmetrical to the Centerline.

710 — Removably Attaching, the Left Wing Structure of the at least two Wing Structures, Arranged on the Left Side of the Centerline, to the Nose Structure by Removably Attaching a Left Forward Edge of the Left Wing Structure to the Left Aft Edge.

715 — Removably Attaching, the Right Wing Structure of the at least two Wing Structures, Arranged on the Right Side of the Centerline, to the Nose Structure by Removably Attaching a Right Forward Edge of the Right Wing Structure to the Right Aft Edge.

720 — Removably Attaching, the Left Wing Structure to the Right Wing Structure at the Centerline, wherein there is no Clear Demarcation between the at least two Wing Structures and the Nose Structure of the Plurality of Common Components of the BWB Aircraft.

*FIG. 7*

MODULAR BLENDED WING BODY (BWB) AIRCRAFT AND METHOD OF MANUFACTURE

FIELD OF THE INVENTION

The present invention generally relates to the field of blended wing body (BWB) aircraft. In particular, the present invention is directed to a modular blended wing body (BWB) aircraft and method of manufacture.

BACKGROUND

Airplanes with greater capacity are less expensive to operate on a cost per ton-nm basis. However, airplanes with greater capacity are generally more expensive to operate per mile. The capacity of existing airplanes is generally matched with route demand and flight frequency so that airplanes are operated near capacity to minimize cost. Additionally, or alternatively, large airplanes with high capacity may be unable to operate at airports intended for smaller airplanes due to limits of runway and taxiway dimension and weight limitations, as well as terminal gate dimensions.

SUMMARY OF THE DISCLOSURE

In an aspect, a modular blended wing body (BWB) aircraft is described. The modular BWB includes a plurality of common components, wherein the plurality of common components includes a nose structure having a left aft edge and a right aft edge intersecting on a centerline of the BWB on one end and intersecting on a leading edge of the BWB on another end, and at least two wing structures attached to the nose structure, wherein the at least two rear structures includes a left-wing structure arranged on the left side of the centerline, wherein the left-wing structure includes a left forward edge, and a right-wing structure arranged on the right side of the centerline, wherein the right-wing structure includes a right forward edge, and wherein the left-wing structure and the right-wing structure are laterally symmetrical to the centerline, and attaching the at least two wing structures to the nose structure includes attaching the left forward edge to the left aft edge, attaching the right forward edge to the right aft edge, and attaching the left-wing structure and the right-wing structure at the centerline, wherein there is no clear demarcation between the at least two wing structures and the nose structure of the plurality of common components of the BWB aircraft.

In another aspect, a method for manufacturing a blended wing body (BWB) aircraft is described, the method includes receiving a plurality of common components, wherein the plurality of common components includes a nose structure having a left aft edge and a right aft edge intersecting on a centerline of the BWB on one end and intersecting on a leading edge of the BWB on another end, and at least two wing structures having a left-wing structure, wherein the at least two wing structures are laterally symmetrical to the centerline, attaching, a left-wing structure of the at least two wing structures, arranged on the left side of the centerline, to the nose structure by attaching a left forward edge of the left-wing structure to the left aft edge, attaching, a right-wing structure of the at least two wing structures, arranged on the right side of the centerline, to the nose structure by attaching a right forward edge of the right-wing structure to the right aft edge, and attaching, the left-wing structure to the right-wing structure at the centerline, wherein there is no clear demarcation between the at least two wing structures and the nose structure of the plurality of common components of the BWB aircraft.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 6A-C are diagrams illustrating exemplary embodiments for checking a curvature of a revised expansion component with curved-wrap scheme;

FIG. 7 is a flow diagram illustrating an exemplary method for manufacturing a modular BWB aircraft;

Figure 1A:
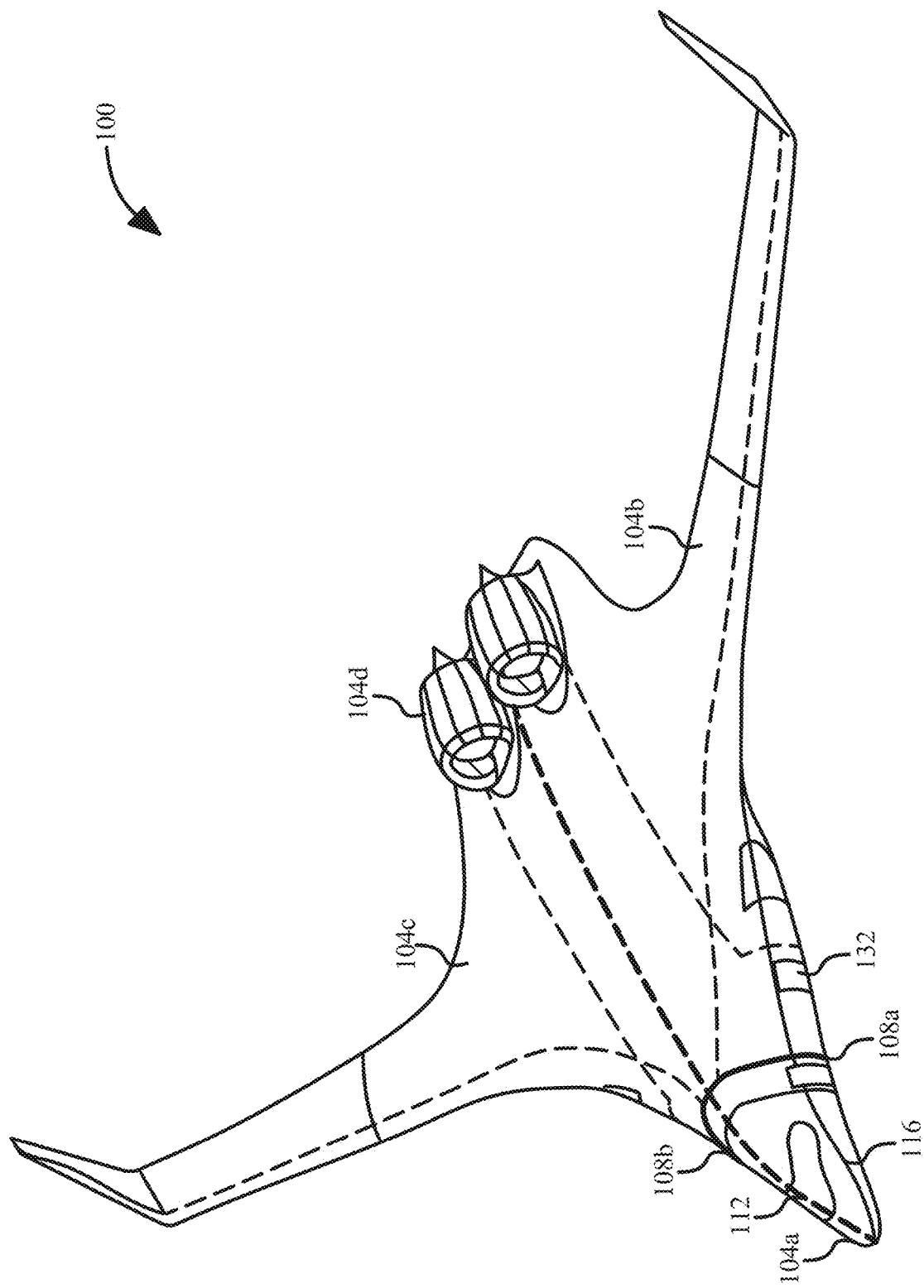
FIG. 1A-B are schematics of a modular BWB aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a modular BWB aircraft and method of manufacture. Aspect of the present disclosure allows for reduction in cost of designing, developing, and building of airplanes. Airplanes are expensive to design, develop and build. Airplanes are generally made in small quantities compared to other mass-produced products; therefore, the nonrecurring cost of design and development is a significant component of airplane sales price. Additionally, airplane sales price is a significant portion of overall airline operating costs. This means that the cost to design and develop an airliner is significantly reflected in the passenger's ticket cost. The cost to manufacture airplanes depends in part on how many are made and the rate at which they are made. Further, facilities to manufacture airplanes are expensive in terms of land, buildings, and equipment. If these facilities may be used to make aircraft at a greater rate or in greater number, their cost per airplane, as well as ticket price declines. This is so, at least in part, because the modular BWB may include a set of common components, wherein the set of common components comprises a nose structure and at least two wing structures attached to the nose structure, and wherein there is no clear demarcation between the at least two wing structures and the nose structure.

Aspects of the present disclosure can be used to enlarge a BWB aircraft. Aspects of the present disclosure can also be used to provide a wide range of aircraft capacity. This is so, at least in part, because the modular BWB may include at least an expansion component having at least an expansion feature, wherein the at least an expansion component may be configured to enlarge the modular BWB as a function of the at least an expansion feature by inserting the at least an expansion component between the nose structure and the at least two wing structures relative to a center line of the modular BWB. Exemplary embodiments illustrating aspects of the present disclosure are described below in the context of several specific examples.

In the following description, for the purposes of explanation, numerous specific details are set forth in order to provide a thorough understanding of the present invention. For purposes of description herein, relating terms, including "upper", "lower", "left", "rear", "right", "front", "vertical", "horizontal", and derivatives thereof relate to embodiments oriented as shown for exemplary purposes in FIG. 1-6. Furthermore, there is no intention to be bound by any expressed or implied theory presented in this disclosure.

The manufacturing methods, materials, and systems described hereinafter as making up the various elements of the present disclosure are intended to be illustrative and not restrictive. Many suitable materials, struts, systems, and configurations that would perform the same or a similar function as the systems described herein are intended to be embraced within the scope of the disclosure. Such other systems and methods not described herein can include, but are not limited to, vehicles, systems, networks, materials, and technologies that are developed after the time of the development of the disclosure.

Now referring to FIG. 1A, an exemplary embodiment of a modular blended wing body (BWB) aircraft 100 is illustrated. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. For example, a BWB 104 aircraft may have distinct wing and body structures, which are smoothly blended together with no clear dividing line or boundary feature between wing and fuselage. This contrasts with a flying wing, which has no distinct fuselage, and a lifting body, which has no distinct wings. A BWB 104 design may or may not be tailless. One potential advantage of a BWB 104 may be to reduce wetted area and any accompanying drag associated with a conventional wing-body junction. In some cases, a BWB 104 may also have a wide airfoil-shaped body, allowing entire aircraft to generate lift and thereby facilitate reduction in size and/or drag of wings. In some cases, a BWB 104 may be understood as a hybrid shape that resembles a flying wing, but also incorporates features from conventional aircraft. In some cases, this combination may offer several advantages over conventional tube-and-wing airframes. In some cases, a BWB airframe 104 may help to increase fuel economy and create larger payload (cargo or passenger) volumes within the BWB. BWB 104 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

Still referring to FIG. 1A, as described in this disclosure, a "modular BWB aircraft" is BWB aircraft with modularity (i.e., BWB aircraft having one or more modular nature). In a non-limiting example, modular BWB aircraft 100 may include any BWB aircraft having the ability of the aircraft to switch between different configurations, depending on the mission requirements. Modular BWB aircraft 100 may be built with interchangeable parts that can be replaced or modified without affecting the rest of the structure. In some cases, modular BWB aircraft 100 may allow for a versatile fleet of aircraft that can be adjusted based on needs. For instance, and without limitation, modular BWB aircraft may be configured for (different capacities for) passenger transportation, cargo transportation, or even specialized functions such as, without limitation, airborne surveillance, aerial refueling, or emergency medical services as described in further detail below.

With continued reference to FIG. 1A, modular BWB aircraft 100 includes a plurality of common components 104a-d. For the purposes of this disclosure, "common components" are components of a modular BWB aircraft that remain constant across a family of BWB aircraft having a portion of common components. In an embodiment, plurality of common components 104a-d may include any portion of modular BWB aircraft 100 that remains the same across a family of BWB aircraft. As a non-limiting example, plurality of common components 104a-d may include a nose structure 104a. As described herein, a "nose structure," also known as a "nose portion" or a "nose," refers to any portion of modular BWB aircraft 100 forward of any portion of modular BWB aircraft 100 (i.e., other common components as described below). In an embodiment, nose structure 104a may include a cockpit (for manned aircraft), canopy, aerodynamic fairings, windshield, and/or any structural elements required to support mechanical loads. Additionally, or alternatively, nose structure 104a may also include pilot seats, control interfaces, gages, displays, inceptor sticks, throttle controls, collective pitch controls, and/or communication equipment, to name a few. In a non-limiting example, nose structure 104a may be disposed in front of the fuselage of the modular BWB aircraft 100. In some cases, nose structure 104a may include a swing nose configuration, wherein the swing nose configuration may be characterized by an ability of the nose to move, manually or automatedly, into a differing orientation than its flight orientation to provide an opening for loading a payload into modular BWB aircraft 200 fuselage from the front of the aircraft. Nose portion may be configured to open in a plurality of orientations and directions.

With continued reference to FIG. 1A, each common component of plurality of common components 104a-d may include at least a structural component of modular BWB aircraft 100. Structural components may provide physical stability during an entirety of an aircraft's 100 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 100 structure, they may be so named A, B, C, and so on named from nose to tail. Pillars, like any structural element, may be disposed a distance away from each other, along an exterior of modular BWB aircraft 100. Depending on manufacturing method of the BWB, pillars may be integral to frame and skin, comprised entirely of internal framing, or alternatively, may be only integral to structural skin elements. Structural skin will be discussed in greater detail below.

Still referring to FIG. 1A, plurality of common components 104*a-d* of modular BWB aircraft 100 may include a plurality of materials, alone or in combination, in its construction. In a non-limiting example, at least a BWB of modular BWB aircraft 100, in an illustrative embodiment may include a welded steel tube frame further configured to form a general shape of nose structure 104*a* corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. One or more common component of plurality of common components 104*a-d* may include aluminum tubing mechanically coupled in various directions and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. One or more common component of plurality of common components 104*a-d* may additionally or alternatively use wood or another suitably strong yet light material for an internal structure.

With continued reference to FIG. 1A, nose structure 104*a* includes a left aft edge 108*a* and a right aft edge 108*b* intersecting on a centerline 112 of BWB on one end and intersecting on a leading edge 116 of BWB on another end. As used in this disclosure, "left aft edge" refers to the rear edge of nose structure 104*a* on the left side from modular BWB aircraft's 100 point of view, while "right aft edge" refers to the rear edge of nose structure 104*a* on the right side from modular BWB aircraft's 100 point of view. It should be noted that left side and right side may be used interchangeably with "port side" and "starboard side" respectively in this disclosure. In an embodiment, nose structure 104*a* may be detached from modular BWB aircraft 100 along left aft edge 108*a* and right aft edge 108*b*. A "centerline," for the purpose of this disclosure, is an imaginary line that runs lengthwise down the middle of modular BWB aircraft from the nose structure (front) to the tail (rear). In an embodiment, centerline 112 may be aligned with a longitudinal axis of modular BWB aircraft 100, wherein the longitudinal axis is an axis about which the aircraft rolls or pitches. In a non-limiting example, left aft edge 108*a* and right aft edge 108*b* may intersect at a point between nose and an empennage, wherein the empennage may be disposed at the aftmost point of BWB. Empennage may include a tail of modular BWB aircraft 100, further containing rudders, vertical stabilizers, horizontal stabilizers, stabilators, elevators, trim tabs, among others. At least a portion of empennage may be manipulated directly or indirectly by pilot commands as described below to impart control forces on a fluid in which the modular BWB aircraft 100 is flying, wherein manipulation of these empennage control surfaces may, in part, change modular BWB aircraft's 100 heading in pitch, roll, and yaw.

Still referring to FIG. 1A, a "leading edge," as described herein, is the front edge of an aircraft component that first comes into contact with air as modular BWB aircraft moves or as the air flows over it. In some cases, leading edge 116 may be the part of nose structure 104*a* that meets the oncoming airflow. In a non-limiting example, the geometry of nose structure 104*a* towards the aft side (i.e., rear or back part of nose structure 104*a*) may be defined by left aft edge 108*a* and right aft edge 108*b* as a converging or tapering shape. Left aft edge 108*a* and right aft edge 108*b* may be extended symmetrically from centerline 112 towards leading edge 116 on either side of centerline 112. Additionally, or alternatively, in one or more non-limiting embodiments, left aft edge 108*a* and right aft edge 108*b* of nose structure 104*a* may be "orthogonal" to the leading edge, e.g., left aft edge 108*a* and right aft edge 108*b* may be designed to form a 90-degree angle with leading edge 116. It should be noted that such selection of a perpendicular aft edges is not critical. In some cases, left aft edge 108*a* and right aft edge 108*b* may be designed at a location favorable to the interior arrangement of modular BWB aircraft 100. Persons skilled in the art, upon reviewing the entirety of this disclosure, will be aware of various angles that left aft edge 108*a* and/or right aft edge 108*b* may interact with leading edge 116.

With continued reference to FIG. 1A, modular BWB aircraft 100 may include monocoque or semi-monocoque construction. One or more common components of plurality of common components 104*a-d* may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 1A, plurality of common components 104a-d of modular BWB aircraft 100 may include at least a fuselage. A "fuselage," for the purposes of this disclosure, refers to a main body of modular BWB aircraft 100. In some cases, fuselage may contain an aircraft's payload. At least a fuselage may include structural components that physically support a shape and structure of an aircraft 100. Structural components may take a plurality of forms, alone or in combination with other types. Structural components may vary depending on construction type of modular BWB aircraft 100 and specifically, fuselage. In a non-limiting example, fuselage may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 1A, in some embodiments, at least a fuselage may include geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of modular BWB aircraft 100. In some cases, a former forms a general shape of at least a fuselage. A former may include differing cross-sectional shapes at differing locations along a fuselage, as the former is a structural component that informs the overall shape of the fuselage. In embodiments, aircraft skin can be anchored to formers and strings such that an outer mold line of volume encapsulated by the formers and stringers comprises a same shape as modular BWB aircraft 100 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 1A, according to some embodiments, a fuselage may include monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 1A, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which are may be used in real-world manufacturing for weight savings and for routing of electrical harnesses and other modern onboard systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 1A, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar to bulkheads or frames, and stringers.

With continued reference to FIG. 1A, in some embodiments, another common structural form of fuselage is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 1A, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB of modular BWB aircraft 100. In some cases, monocoque may be considered to include substantially only structural skin, and in that sense, aircraft skin undergoes stress by applied aerodynamic fluids imparted by fluid. Stress as used in continuum mechanics can be described in pound-force per square inch (lbf/in$^2$) or Pascals (Pa). In semi-monocoque construction stressed skin bears part of aerodynamic loads and additionally imparts force on an underlying structure of stringers and formers.

With continued reference to FIG. 1A, a fuselage may include an interior cavity. An interior cavity may include a volumetric space configurable to house passenger seats and/or cargo. An interior cavity may be configured to include receptacles for fuel tanks, batteries, fuel cells, or other energy sources as described herein. In a non-limiting example, interior cavity may include at least a cabin, wherein the at least a cabin is an enclosed, pressurized compartment of modular BWB aircraft 100 where passengers, crew members are accommodated during a flight. In some cases, cabin may include a passenger capacity ranging from a minimum of 140 to a maximum of 350. In some cases, a post may be supporting a floor (i.e., deck), or in other words a surface on which a passenger, operator, passenger, payload, or other object would rest on due to gravity when within an aircraft 100 is in its level flight orientation or sitting on ground. A post may act similarly to stringer in that it is configured to support axial loads in compression due to a load being applied parallel to its axis due to, for example, a heavy object being placed on a floor of aircraft 100. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 1A, plurality of common components 104a-d may include at least two wing structures 104b-c attached to nose structure 104a. In some cases, this may include removable attachment; for instance, and without limitation, at least two wing structures 104b-c may be removably attached to nose structure 104a. As used in this disclosure, "removably attached" means components are connected to each other in a way that they can be securely fixed or fastened for normal use but can also be easily detached or removed when necessary. It should be noted that two wing structures 104b-c may be optionally removable from nose structure 104a, meaning that two wing structure 104b-c may be permanently fastened to nose structure 104a. In an embodiment, each wing structure of at least two wing structures 104b-c may include at least a flight component. A flight component may be consistent with any description of a flight component described below, such as without limitation wings, winglets, empennages, nacelles, control surfaces propulsors, engines or the like. For the purposes of this disclosure, at least a "flight component" is at least one element of modular BWB aircraft 100 configured to manipulate a fluid medium such as air to propel, control, or maneuver an aircraft. In an embodiment, at least a flight component may be one or more devices configured to affect modular BWB aircraft's 100 attitude. In an embodiment, at least two wing structure 104b-c may include a left-wing structure 104b arranged on the left side (i.e., port side) of centerline 112 and a right-wing structure 104c arranged on the right side (i.e., starboard side) of centerline 112, wherein the left-wing structure 104b and the right-wing structure 104c are laterally symmetrical to the centerline (i.e., symmetry of at least two wing structure 104b-c relative to centerline 112 when viewed from above or below).

In a non-limiting example, and still referring to FIG. 1A, each wing structure of at least two wing structures 104b-c may include a wing, wherein the wing may include structures which include airfoils configured to create a pressure differential resulting in lift. At least two wing structures 104b-c may include wings disposed on a left side (i.e., left wing) and right side (i.e., right wing) of modular BWB aircraft 100 (centerline 112) symmetrically: one or more wings of left wing structure 104b and right wing structure 104c may be symmetrical about an aircraft's longitudinal plane, which includes a longitudinal or roll axis reaching down a center of the aircraft through the nose and empennage, and the aircraft's yaw axis. Wings may include a plurality of geometries in planform view, swept swing, tapered, variable wing, triangular, oblong, elliptical, square, among others. Wings may be blended into the body of the aircraft such as in a modular BWB aircraft 100 where no strong delineation of body and wing exists. A wing's cross section geometry may comprise an airfoil. An "airfoil" as used in this disclosure, is a shape specifically designed such that a fluid flowing on opposing sides of it exerts differing levels of pressure against the airfoil. In embodiments, a bottom surface of an aircraft can be configured to generate a greater pressure than does a top surface, resulting in lift. A wing may include differing and/or similar cross-sectional geometries over its cord length, e.g., length from wing tip to where wing meets the aircraft's body.

With continued reference to FIG. 1, in some cases, each wing structure of at least two wing structures 104b-c may include a portion of interior cavity of fuselage of modular BWB aircraft 100. Interior cavity of fuselage of modular BWB aircraft 100 may be evenly divided into two portions having equivalent dimensions. In a non-limiting example, cabin of modular BWB aircraft 100 may include two cabin bays. As used in this disclosure, a "cabin bay" is a part of cabin in which separated by a structural element such as one or more ribs. In some cases, cabin bay may include a passenger bay, wherein the passenger bay may include an enclosed and pressurized area within the cabin wherein a plurality of passenger seats, aisles, lavatories, and other passenger amenities are located; for instance, and without limitation, each cabin bays may include one or more sections/classes (e.g., first class, business class, and economy class) of passenger seats. Left wing structure 104*b* may include a first cabin bay and right wing structure 104*c* may include a second cabin bay, wherein the first cabin bay may be equivalent to the second cabin bay in terms of, such as, without limitation, width, length, height, number of passenger seats, cabin volume, and the like.

Still referring to FIG. 1A, in some cases, wings may include controls surfaces configured to be commanded by a pilot and/or autopilot to change a wing's geometry and therefore its interaction with a fluid medium. In a non-limiting example, left wing structure 104*b* and/or right-wing structure 104*c* ay include may include one or more control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

Additionally, or alternatively, and still referring to FIG. 1A, left wing structure 104*b* and/or right wing structure 104*c* may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for modular BWB aircraft 100. Such devices increase an effective aspect ratio of a wing without greatly increasing wingspan. Extending wingspan may lower lift-induced drag but would increase parasitic drag and would require boosting the strength and weight of the wing. As a result, according to some aeronautic design equations, a maximum wingspan made be determined above which no net benefit exits from further increased span. There may also be operational considerations that limit the allowable wingspan (e.g., available width at airport gates).

Still referring to FIG. 1, in some cases, wingtip devices may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e, toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind modular BWB aircraft 100 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 1A, left wing structure 104*b* includes a left forward edge and right wing structure 104*c* includes a right forward edge. As used in this disclosure, a "left forward edge" refers to a forward-facing edge (i.e., the edge facing the direction of flight) of left wing structure 104*b* configured to join to left aft edge 108*a* of nose structure, while a "right forward edge" refers to a forward-facing edge of right wing structure 104*c* configured to join to right aft edge 108*b* of nose structure 104*a*. Attaching at least two wing structures 104*b-c* to the nose structure 104*a* include attaching left forward edge to left aft edge 108*a*, attaching right forward edge to right aft edge 108*b*, and attaching left-wing structure 104*b* and the right-wing structure 104*c* at the centerline 112. Such attachment of nose structure 104*a* and at least two wing structure 104*b-c* are described in further detail below with reference to FIG. 1B.

With continued reference to FIG. 1A, location and angle of the left forward edge/left aft edge 108*a* and/or right forward edge/right aft edge 108*b* may interact with underlying structures. In an embodiment, left forward edge/left aft edge 108*a* and/or right forward edge/right aft edge 108*b* may be aligned with the local structure elements (e.g., ribs, spars, stringers, skins and/or the like) to avoid cutting through major frames (i.e., structural elements), for example, fuselage frames (i.e., a series of spars and ribs) thereby reducing the weight and complexity of connecting plurality of common components (and expansion component as described below). In a non-limiting example, by perpendicularly orientate left forward edge/left aft edge 108*a* and right forward edge/right aft edge 108*b* to left and right leading edge 116 respectively, left forward edge/left aft edge 108*a* and/or right forward edge/right aft edge 108*b* may be compliant with one or more main frames near nose structure 104*a*. In some cases, left forward edge/left aft edge 108*a* and right forward edge/right aft edge 108*b* may fall between main frames. In other cases, left forward edge/left aft edge 108a and right forward edge/right aft edge 108b may split a main frame.

With continued reference to FIG. 1A, plurality of common components 104a-d may include at least a propulsor 104d, wherein the at least a propulsor 104d may be mechanically attached to at least a wing structure of at least two wing structures 104b-c. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

Still referring to FIG. 1A, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

In a non-limiting example, and still referring to FIG. 1A, at least a propulsor 104d may include an airbreathing engine such as a jet engine, turbojet engine, turboshaft engine, ramjet engine, scramjet engine, hybrid propulsion system, turbofan engine, or the like. At least a propulsor 104d may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In non-limiting embodiments, air-breathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include turbofans. Alternatively, and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 1A, as used in this disclosure, "torque" is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 1A, modular BWB aircraft 100 may include an energy source. In some cases, energy source may be integrated into one or more common components. Energy source may include any device providing energy to at least a flight component 108, for example at least a propulsor 104d. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 1A, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 104 of aircraft 100, for example without limitation within a wing portion 112 of blended wing body 108. Aviation fuels may include petroleum-based fuels, or petroleum and synthetic fuel blends, used to power aircraft 100. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 100. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

With continued reference to FIG. 1A, modular aircraft 100 may include an energy source which may include a fuel cell. As used in this disclosure, a "fuel cell" is an electro-chemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 1A, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 1 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

Still referring to FIG. 1, fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 1A, modular BWB aircraft 100 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 1A, modular BWB aircraft 100 may include multiple flight component subsystems, each of which may have a separate energy source. For instance, and without limitation, one or more flight components may have a dedicated energy source. Alternatively, or additionally, a plurality of energy sources may each provide power to two or more flight components, such as, without limitation, a "fore" energy source providing power to flight components located toward nose structure 104a, while an "aft" energy source provides power to flight components located toward tailing edge 148 of modular BWB aircraft 100. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 1A, plurality of common components may further include at least a nacelle. For the purposes of this disclosure, a "nacelle" is a streamlined body housing, which is sized according to that which is houses, such as without limitation, flight components. When attached by a pylon entirely outside an airframe, a nacelle may sometimes be referred to as a pod, in which case an engine within the nacelle may be referred to as a podded engine. In some cases, an aircraft cockpit may also be housed in a nacelle, rather than in a conventional fuselage. At least a nacelle may substantially encapsulate at least a propulsor 104d, which may include a motor, or an engine as described above. At least a nacelle may be mechanically connected to at least a portion of modular BWB aircraft 100 (e.g., left wing structure 104b, right wing structure 104c, and/or the like) partially or wholly enveloped by an outer mold line (OML) of the aircraft 100. At least a nacelle may be designed to be streamlined. At least a nacelle may be asymmetrical about a plane comprising the longitudinal axis of the engine and the yaw axis of modular BWB aircraft 100.

With continued reference to FIG. 1A, in some cases, modular BWB aircraft 100 may include at least a pilot control. As used in this disclosure, a "pilot control," is an interface device that allows an operator, human or machine, to control a flight component of an aircraft. In some cases, pilot control may be located within nose structure 104a as described above. Pilot control may be communicatively connected to any other component presented in modular BWB aircraft 100, the communicative connection may include redundant connections configured to safeguard against single-point failure. In some cases, a plurality of attitude datums may indicate a pilot's instruction to change heading and/or trim of modular BWB aircraft 100. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and modular BWB aircraft 100. "Throttle", for the purposes of this disclosure, refers to an aircraft outputting an amount of thrust from a propulsor. In context of a pilot input, throttle may refer to a pilot's input to increase or decrease thrust produced by at least a propulsor as described below. Other common components such as, without limitation, at least two wing structures as described below and devices (e.g., flight components) thereof may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle. "Attitude", for the purposes of this disclosure, is the relative orientation of a body, in this case modular BWB aircraft 100, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to modular BWB aircraft 100. A plurality of attitude datums may indicate one or more measurements relative to an aircraft's pitch, roll, yaw, or throttle compared to a relative starting point. One or more sensors may measure or detect an aircraft's 100 attitude and establish one or more attitude datums. An "attitude datum", for the purposes of this disclosure, refers to at least an element of data identifying an attitude of modular BWB aircraft 100.

With continued reference to FIG. 1A, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component. At least a flight component may include any propulsor as described herein. In embodiment, at least a flight component may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 1A, at least a sensor may include an angle of attack sensor and a yaw sensor. In some embodiments, angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively, or additionally, in some cases, angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 1A, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 1A, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

Still referring to FIG. 1A, modular BWB aircraft 100 may include a flight controller. As used in this disclosure, a "flight controller" is a device that generates signals for controlling at least a flight component of modular BWB aircraft 100. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 1A, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of the system and/or computing device.

With continued reference to FIG. 1A, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 1B:
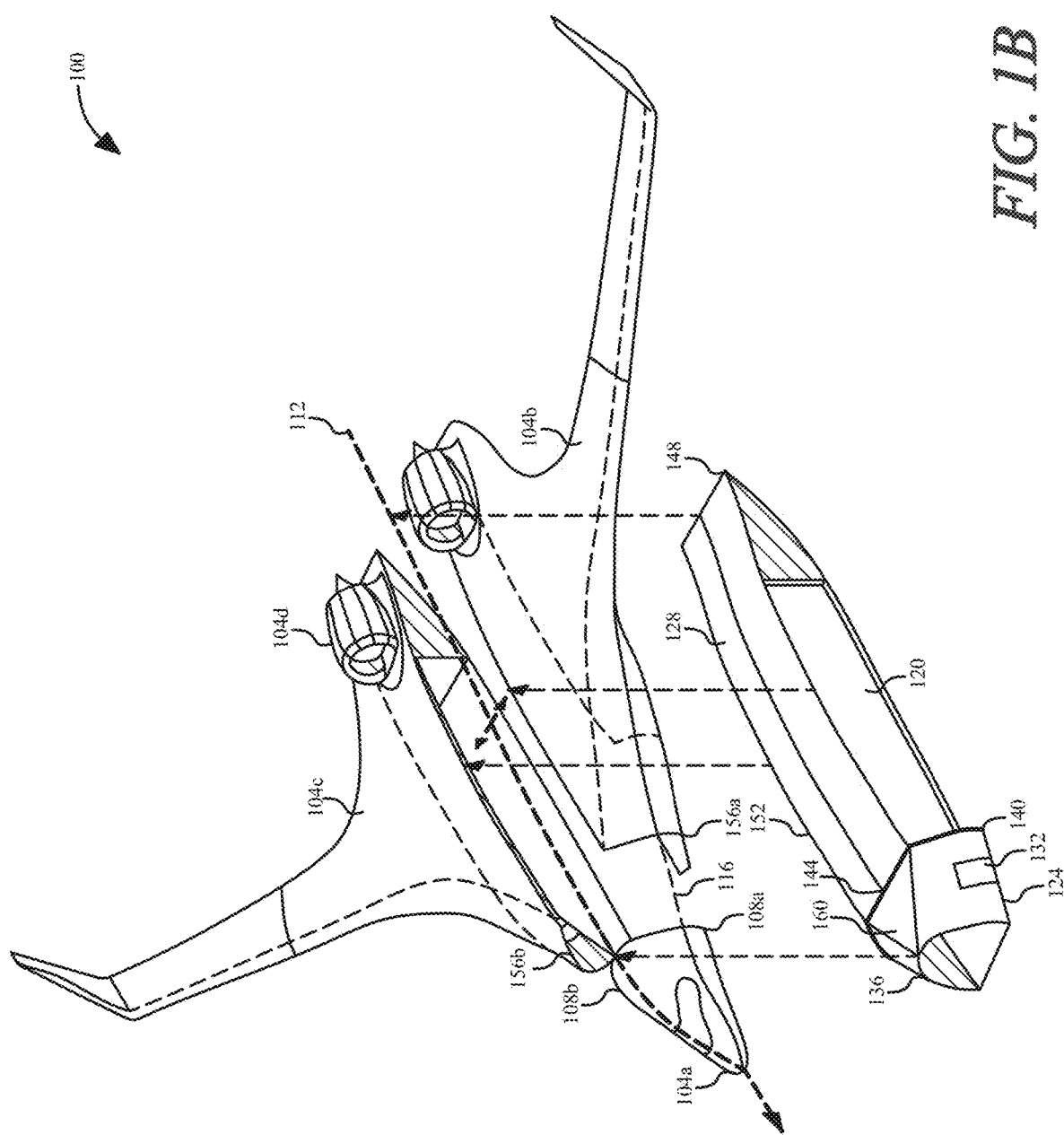

Now referring to FIG. 1B, a modular BWB aircraft 100 having an expansion component 120 is illustrated. Modular BWB aircraft 100 may include an expansion component 120. As used in this disclosure, an "expansion component" is a structural element that allows modular BWB aircraft's 100 structure to be expanded or enlarged. In some cases, expansion component 120 may include at least an expansion feature. An "expansion feature," for the purpose of this disclosure, refers to a specific characteristic, design element, or otherwise system within the expansion component that facilitates or contributes to the enlargement of modular BWB aircraft. In a non-limiting example, expansion component 120 having a modular internal layout may be designed to increase passenger or cargo capacity of modular BWB aircraft 100, wherein the modular internal layout may be flexible, allowing the space within the expansion component to be customized to suit different needs, for example, by adding or removing one or more cabin bays (each containing a plurality of passenger seats and/or cargo spaces) to modular BWB aircraft 100. In one or more embodiments, expansion component 120 may be configured to enlarge the BWB as a function of at least an expansion feature by inserting expansion component 120 between plurality of common components 104*a-d* of modular BWB aircraft 100 relative to the centerline 112. In an embodiment, expansion component 120 may be designed to interface seamlessly with plurality of common components 104*a-d*, such as, without limitation, nose structure 104*a*, left wing structure 104*b*, and right-wing structure 104*c*, allowing modular BWB aircraft's 100 size to be increased without compromising structural integrity or aerodynamic performance of modular BWB aircraft 100.

Still referring to FIG. 1B, expansion component 120 of modular BWB aircraft 100 may include a collar 124 and a central width body 128 connected to the collar 124. For the purposes of this disclosure, a "collar" is a portion of expansion component 120 disposed aft of the nose structure 104*a*, extending the lateral width of the aircraft and including a transitional cross-sectional shape. In an embodiment, collar 124 may include any structure as disclosed herein such a stringer and station frame or structural skin construction. In a non-limiting example, collar 124 may include one or more aerodynamic surfaces configured to generate lift or serve as control surfaces as described herein. In some cases, collar 124 of expansion component 120 may include one or more openings 132, wherein the "openings," for the purpose of this disclosure, are access points or portals that function similarly to passenger doors on conventional aircraft. In a non-limiting example, one or more openings 132 may be designed to allow passengers to enter and exit modular BWB aircraft safely and efficiently. In some cases, openings 132 may include emergency exits, if necessary. In an embodiment, openings 132 may be engineered to seal securely during flight to maintain cabin pressure and protected against the external environment. Exemplary embodiments of openings 132 may include, without limitation, standard doors, sliding doors, hatch-style doors, and/or the like.

In a non-limiting example, and still referring to FIG. 1B, a first modular BWB aircraft with expansion component 120 inserted may include three passenger doors in leading edge 116 on each side of aircraft/centerline 112. First modular BWB aircraft may include a larger passenger capacity of 235, compared to a second modular BWB aircraft without expansion component 120 inserted that only include two cabin bays (having a passenger capacity of 140). Smaller aircraft (i.e., aircraft with smaller capacity) may require fewer openings 132 (i.e., passenger doors); therefore, the number of heavy, complicated, and expensive doors may be "automatically" adjusted according to the capacity of modular BWB aircraft 100. Conversely, openings 132 may be disposed on one or more common components. In a non-limiting example, modular BWB aircraft 100 may include two emergency doors at the aft end of cabin, hidden below at least two wing structures 104*b-c*. Including openings 132 needed for modular BWB aircraft 100 in one or more common components means that openings 132 may be included in every family member, wherein such inclusion may be necessary since bigger aircrafts (i.e., aircraft with bigger capacity) may need at least the same number of openings 132 as smaller aircraft. Additionally, inclusion of openings 132 in one or more common components may also tend to reduce the cost (e.g., cost per passenger door) since openings 132 are designed and tooled only once for the entire family.

Still referring to FIG. 1B, it should be noted that, even though the locations of openings 132 may work out nicely for certain expansion component 120 arrangement, the opening locations may not, for example and without limitation, be favorable for the interior arrangement. In some cases, aircraft side doors may be linked left to right by a cross-aisle, wherein the cross-aisle may enable a lateral passenger movement to openings 132. Such lateral linkage may also be important in the event of an emergency in which one side of the aircraft, for example and without limitation, cannot be used (e.g., a fire on one side). Such cross-aisles may divide the interior in an unfavorable way. In a non-limiting example, an aisle may divide an interior in such a way that logical proportions of economy and business class cabins are difficult to achieve or inelegant.

In another non-limiting example, and still referring to FIG. 1B, openings 132 may further include one or more freighter doors (i.e., larger openings specifically designed for loading and unloading cargo or freight). Such openings 132 may be made for alternative missions such as, without limitation, commercial freight transport, military tanker/freighter, and possible military reconnaissance aircraft. In some cases, plurality of common components 104a-d may be retained for these derivative aircrafts for cost saving purposes. Additionally, or alternatively, alternative expansion component 120 may be made for derivative purposes; for instance, and without limitation, in an embodiment, expansion component 120 for a commercial freighter may include one or more large freighter doors instead of passenger doors as described above. Such expansion component 120 may be appropriate for commercial freighter and a military tanker/freighter that also has a freighter role. In some cases, freighter doors may be located on one side only of expansion component 120, for example and without limitation, port side of expansion component 120.

With continued reference to FIG. 1B, collar 124 may include a front collar edge 136 and an aft collar edge 140, wherein the collar 124 may be attached to nose structure 104a at the front collar edge 136 and central width body 128 at the aft collar edge 140. As used in this disclosure, a "central width body" is a main body section of expansion component 120. In an embodiment, central width body may be the substantial part of expansion component 120 that connects to at least two wing structures 104b-c on either side, and presumably designed to implement expansion feature, for example, and without limitation, to increase the capacity or add additional functionalities to modular BWB aircraft 100. Central width body 128 includes a front central width body edge 144 attached to the aft collar edge 140 and at least a portion tailing edge 148 of BWB. In a non-limiting example, central width body 128 may include a predetermined width, wherein the predetermined width may be constant across central width body 128. Such expansion component 120 with central width body 128 may be configured to increase the overall width of modular BWB aircraft 100. Alternatively, central width body 128 may include fuselage as described above containing at least a portion of interior cavity (i.e., cabin). In some cases, collar 124 may be one continuous component with central width body 128.

Still referring to FIG. 1, in some cases, central width body 128 of expansion component 120 described herein may include at least a portion of center body of BWB. In some cases, central width body 128 may join with a transitional wing on each side, wherein the transitional wing may join with corresponding wing structures (i.e., outboard wing and winglets); therefore, central width body 128 may be an important aerodynamic part of at least two wing structures 104b-c, e.g., central width body's 128 aerodynamics may be sensitive to the shape of central width body. In an embodiment, expansion component 120 may be designed in such a way that it does not adversely affect the aircraft's aerodynamics. For example, and without limitation, central width body 128 of expansion component 120 may include an upper/lower surface configured to maintain the smooth, blended shape of BWB to minimize drag. In a non-limiting example, central width body 128 may include a flat-wrap center band 152. As used in this disclosure, a "center band" is a strip or belt-like structure that encircles or wraps around at the center of an object. In come cases, center band may provide a plurality of reinforcement or connection points to one or more common components attached to central width body such as, without limitation, at least two wing structures 104b-c. For the purpose of this disclosure, a "flat-wrap center band" is a flat (i.e., level and smooth, without substantial curvature, protrusions, or depressions) structural element that wraps around the central width body 128. In a non-limiting example, flat wrap center band 152 be configured to have a flat surface that runs from front central width body edge 144 to tailing edge 148 of modular BWB aircraft 100, wherein front central width body edge 144 may start at a peak of centerline 112 (i.e., a point at centerline 112 having a slope of zero). Such flat wrap center brand 152 may wrap modular BWB aircraft 100 relative to centerline 112, providing a surface for attaching at least two wing components 104b-c.

Still referring to FIG. 1B, in some cases, front collar edge 136 of collar 124 may match with left aft edge 108a and right aft edge 108b of nose structure 104a, and aft collar edge 140 of collar 124 may match with left forward edge 156a of left wing structure 104b and right forward edge 156b of right wing structure 104c. In an embodiment, collar 124 may be connected to central width body 128 through a connecting surface 160, wherein the "connecting surface," as described herein, refers to a structural interface that links different components together. In some cases, connecting surface 160 may include a plurality of boundaries, wherein each boundary of the plurality of boundaries may interact with at least an edge of one or more components, connecting one component to another component. In a non-limiting example, for connecting expansion component 120 with central width body having flat-wrap center band 152, connecting surface 160 may include a triangular plane arranged symmetrically with centerline 112, wherein the triangular plane may include a left boundary intersecting with a right edge of collar's 124 left outboard surface, a right boundary intersecting with a left edge of collar's 124 right outboard surface, and a rear boundary intersecting with front central width body edge 144, thereby connecting outboard surfaces of collar 124 with flat-wrap center band 152. Such connecting surface 160 may include no longitudinal crease on centerline 112; therefore, slope of boundaries at centerline 112 may be zero. In this case, collar's 124 outboard surfaces may include aerodynamic surfaces that are tangent (i.e., having a continued slope at any point of their joined ends) to connecting surface 160. It should be noted that, moving front collar edge 136 may result in a slop discontinuity, for example, and without limitation, when front collar edge 136 is disposed slightly ahead of centerline's 112 peak, centerline 112 may still sloping upward as front collar edge 136 moves aft. Slope discontinuity may stop when the centerline 112 reaches connecting surface 160 and resume as centerline 112 departs from connecting surface and rejoins front central width body edge 144.

With continued reference to FIG. 1B, in an embodiment, central width body 128 may be configured to maintain a favorable airplane center of gravity (CG). A favorable CG may enable a desired flight stability and control characteristics; However, fine-tuning of CG for modular BWB aircraft 100 may be needed. In a non-limiting example, slightly wedge-shaped central width body (i.e., central width body with varied width) may replace parallel-sided central width body (i.e., central width body with constant width), resulting in a "toe out" condition (e.g., width of central width body may be gradually decreased from front central width body edge 144 to tailing edge 148) that increases wing sweep angle of modular BWB aircraft 100. Conversely, in another non-limiting example, width of central width body may be gradually increased from front central width body edge 144 to tailing edge 148, for example, and without limitation, in a "toe in" condition, thereby reducing wing sweep angle of modular BWB aircraft 100. In some cases, increasing wing sweep angle may tend to move CG of modular BWB aircraft 100 forward with respect to a CG target provided by professionals such as stability and control engineers, and vice-versa. It should be noted that the method for fine-tuning CG disclosed herein may not be the only method and best method.

With continued reference to FIG. 1B, in one or more embodiments, without limitation, expansion component 120 of modular BWB aircraft 100 may include a central fuselage extension, designed to lengthen BWB and increase its passenger or cargo capacity as described above. In a non-limiting example, central width body 128 may include a plurality of central cabin bays, wherein each central cabin bay of the plurality of central cabin bays may include a plurality of passenger seats. In other embodiments, without limitation, expansion component 120 may include an additional wing section, wherein the additional wing section may be configured to increase modular BWB aircraft's 100 wing structures and thus modular BWB aircraft's 100 lift and payload volume. It should be noted that expansion component 120 may be possible to include other functional components such as, without limitation, one or more additional propulsors to increase the modular BWB aircraft's power and speed. In a non-limiting example, expansion component 120 may include a large planar or conformal phased-array antenna disposed on both side of collar's 124 outboard surface. In some cases, phased array antenna may benefit in resolution and range from large dimensions. In a non-limiting example, expansion component 120 may include collar 124 having outboard surface on both side that supports a 100"×100" planar array. Such phased array antennas may provide a field of view of 120°; this field may thus cover the forward aspect from the swept antennas. Additionally, or alternatively, an additional aft-looking antenna may be added. In another non-limiting example, expansion component 120 may include an installation or integration of one or more energy sources as described above. In an embodiment, one or more energy sources may include one or more additional liquid hydrogen fuel tanks. In such embodiment, such integration of one or more additional energy sources may be useful for long-haul flights or missions that require extended endurance. In some cases, expansion components 120 may include necessary plumbing to integrate additional energy sources with aircraft's existing energy sources.

With continued reference to FIG. 1B, inserting expansion component 120 between plurality of common components 104a-d may include repositioning plurality of common components 104a-d. In an embodiment, nose structure 104a may be moved forward along centerline 112 and at least two wing structures 104b-c may be moved directly outboard of centerline 112 by a selected dimension. In some cases, nose structure 104a may be moved forward along centerline 112 without any change in vertical height. In a non-limiting example, for a given expansion component with a 138-inch-wide central width body, each wing structure of at least two wing structures 104b-c may be moved outboard by 69 inches. Nose structure 104a may be moved directly forward by a distance that maintains the tangency of leading edge 116 across collar 124 of expansion component 120. Expansion component 120 may then be inserted between separated plurality of common components relative to centerline 112.

Still referring to FIG. 1B, expansion component 120 may be designed to connect securely and seamlessly with plurality of common components 104a-d, ensuring a strong and stable structure and maintaining the aerodynamic efficiency of the BWB design. In an embodiment, expansion component 120 may be mechanically assembled to plurality of common components 104a-d. Such mechanical connection may be reversible so that, for example, and without limitation, a modular BWB aircraft may be disassembled to remove its inserted expansion component 120. A second expansion component such as, without limitation, a freighter expansion component (i.e., expansion component having one or more freighter door on one side of collar and central width body containing a cargo cabin) may replace the expansion component 120 and modular BWB aircraft may then be reassembled. Such replacement of expansion component 120 may be a favorable way to convert, for example and without limitation, an airliner to a tanker. In a non-limiting example, nose structure 104a may be attached to collar 124 of expansion component 120, wherein attaching nose structure 104a to collar 124 may include attaching left aft edge 108a and right aft edge 108b to front collar edge 136. At least two wing structures 104b-c may be attached to central width body 128 of expansion component 120, wherein attaching at least two wing structures 104b-c to central width body 128 may include attaching left wing structure 104b to left side of central width body 128 with left forward edge 156a attached to left section of aft collar edge 140 and attaching right wing structure 104c to right side of central width body 128 with right forward edge 156b attached to right section of aft collar edge 140.

With continued reference to FIG. 1B, in some cases, attaching plurality of common components 104a-d to expansion component 120 may include attaching nose structure 104a and at least two wing structures 104b-c to collar 124 and central width body 128 via one or more interface components. As used in this disclosure, an "interface component" is a part or system that is configured to facilitate the removable attachment between components of modular BWB aircraft 100. In an embodiment, interface component may include a latching mechanism. Latching element may include a pin, but alternatively or additionally may comprise a loop, D-ring, slot, channel, opening, hole, or another undisclosed type, to name a few. Latching element may be disposed in or on a surface of payload pallet, alone or one amongst a plurality of latching elements. Latching element may be disposed evenly or irregularly spaced along a surface or multiple surfaces of payload pallet. Latching element may comprise a component mechanically coupled to payload pallet or a component integral to payload pallet itself. One or ordinary skill in the art would appreciate that latching element may be disposed in a plurality of locations on at least an interface component. In a non-limiting example, latching mechanism may comprise a hook to capture at least a portion of latching element. One of ordinary skill in the art would appreciate that the mechanical shape and properties of one latching element may inform the mechanical shape and properties of latching mechanism that captures at least a portion of it. In other words, and in a non-limiting example, a plurality of latching elements may require a plurality of latching mechanisms. This example in no way limits the embodiments the latching mechanism or element may take, and in no way precludes the use of latching mechanism with any one or more of a plurality latching elements and vice versa.

Still referring to FIG. 1B, latching mechanism may be actuated manually or automatedly. Latching mechanism may include spring loaded elements that allow for at least a component (i.e., at least a common component) to move past at least another component (i.e., expansion component 120) in a first direction, actuate latching mechanism on the way by, and latch on to latching element and hinder movement of at least a common component in a second direction. Latching mechanism may be mechanically actuated to the capture position by a moving payload pallet as previously described or manually by personnel operating modular BWB aircraft 100. Additionally, or alternatively, latching mechanism may be actuated automatedly by a plurality of methods. In a non-limiting example, a pilot from the cockpit may command latching mechanism to the capture position or the release position electronically through any of the actuation systems disclosed above in this paper like hydraulics, pneumatics, or electromechanical, to name a few. These disclosed actuation systems may drive latching mechanism to a capture position, release position, or any other intermediate or extreme position relative to latching element and fuselage.

Still referring to FIG. 1, latching mechanism, latching element, payload pallet, may include suitable materials for high-strength, low-weight applications one of ordinary skill in the art of aircraft manufacture, passenger airlines, airline freighting would appreciate there is a vast plurality of materials suitable for construction of this payload system in a modular aircraft. Some materials used may include aluminum and aluminum alloys, steel and steel alloys, titanium and titanium alloys, carbon fiber, fiberglass, various plastics including acrylonitrile butadiene styrene (ABS), high-density polyethylene (HDPE), and even wood, to name a few.

With continued reference to FIG. 1B, interface component may include one or more mating surfaces including a male portion disposed on at least a common component and a female portion disposed on expansion component 120 or vice versa. Interface component may be configured to align at least a common component and expansion component 120 when the male portion is substantially encapsulated by the female portion. Interface component may include a plurality of male and accompanying female portions disposed at a plurality of locations on modular BWB aircraft 100. Interface component may include alignment pins, holes, channels, bosses, slots, or the like to align components for assembly. Interface component may include matched drilling components and riveting, bolting, screwing, doweling, or otherwise mechanically fastening at least a common component and expansion component 120 to one another. In some embodiments, interface component may be integrated into one or more of common components and/or expansion components. Alternatively, or additionally, in some cases, interface component may include one or more fasteners. Exemplary embodiments of fasteners may include without limitation nuts, bolts, screws, rivets, and the like.

According to some embodiments, and still referring to FIG. 1B, interface component may allow for variable adjustment of one or more degrees of freedom of at least a common component such as, without limitation, nose structure 104, left wing structure 104*b*, right wing structure 104*c*, and/or the like, relative to expansion component 120. In a non-limiting example, at least two wing structures 104*b-c* may be attached at a variable angle, i.e., swept back. In some cases, interface component may include one or more structure components that introduce a sweep angle to the wings. Exemplary non-limiting sweep angles may include angles within a range of about 1° to about 15°. In some embodiments, wing sweep may be added to affect fuel efficiency. Alternatively, or additionally, wing sweep may be varied depending upon desired operational speed of modular BWB aircraft 100. For instance, and without limitation, in some embodiments, swept wings may delay shock waves and accompanying aerodynamic drag rise caused by fluid compressibility, when travelling near a speed of sound (e.g., no less than about Mach 0.5). Alternatively, or additionally, a variable sweep angle may be used for other reasons, such as without limitation to limit drag, limit observability, or improve pilot visibility.

With continued reference to FIG. 1B, expansion component 120 may be configured to retain a continuous outer mold line (OML) of BWB when inserted between and attached to plurality of common component 104*a-d*. For the purposes of this disclosure, "outer mold line" is the outermost surface of an object at any radial point from a center of the object. For example, and without limitation, OML of modular BWB aircraft 100 may include most of the aircraft's skin. For the purpose of this disclosure, "continuous" is the characteristic of aircraft skin to have unbroken streamlines and no discontinuities over the plurality of common components 104*a-d* present in modular BWB aircraft 100. For example, and without limitation, modular BWB aircraft 100 may include a first expansion component of a first size including continuous outer mold line when attached to common components (which always remains the same size, as it is common). Alternatively, modular BWB aircraft 100 may include a second expansion component of a second size and shape, wherein the outer mold line is still continuous when attached to at least a common component 104.

Figure 2A:
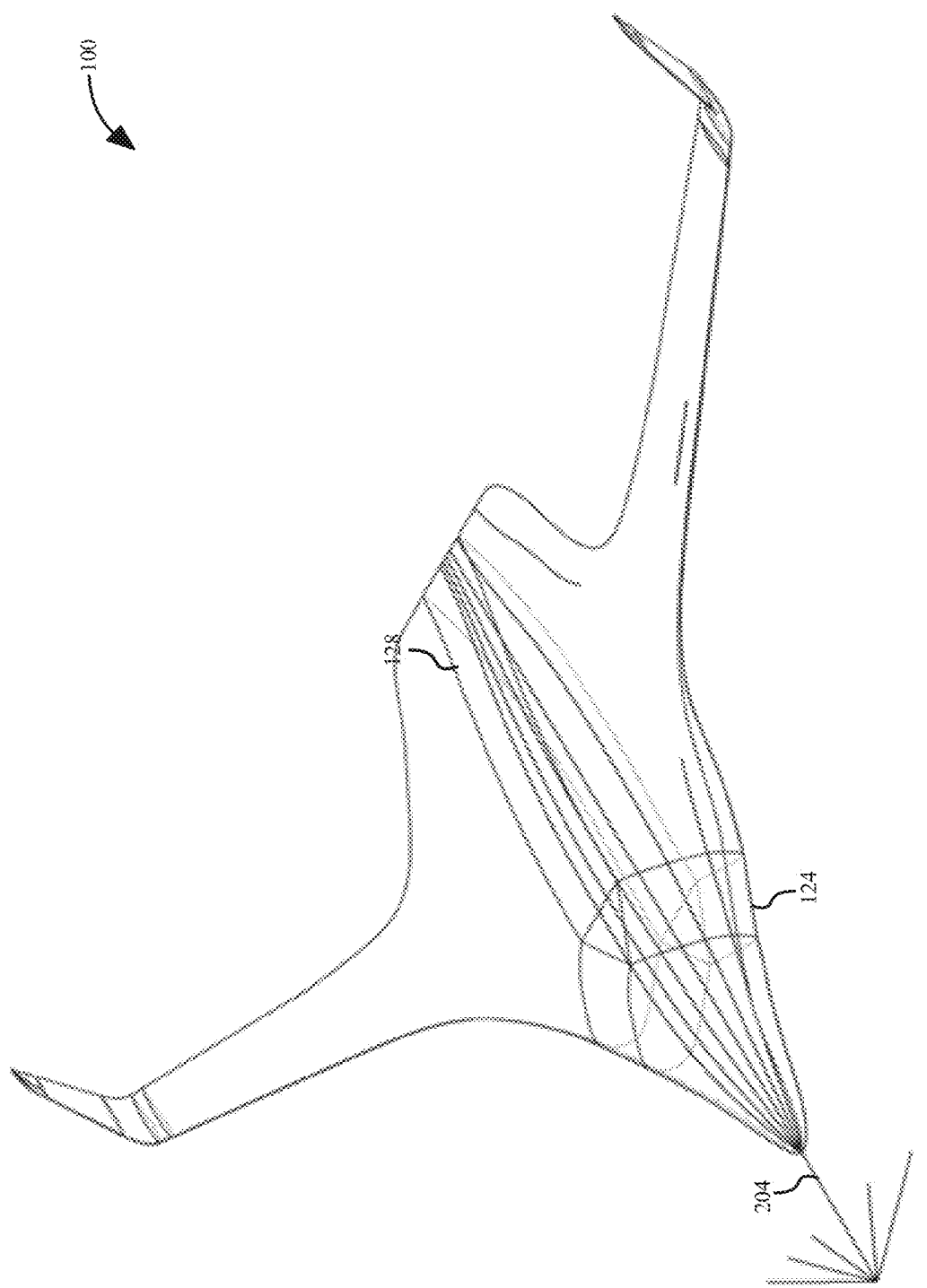
FIG. 2A-C are diagrams illustrating exemplary embodiments for checking a curvature of expansion component with flat-wrap scheme.
Figure 2B:
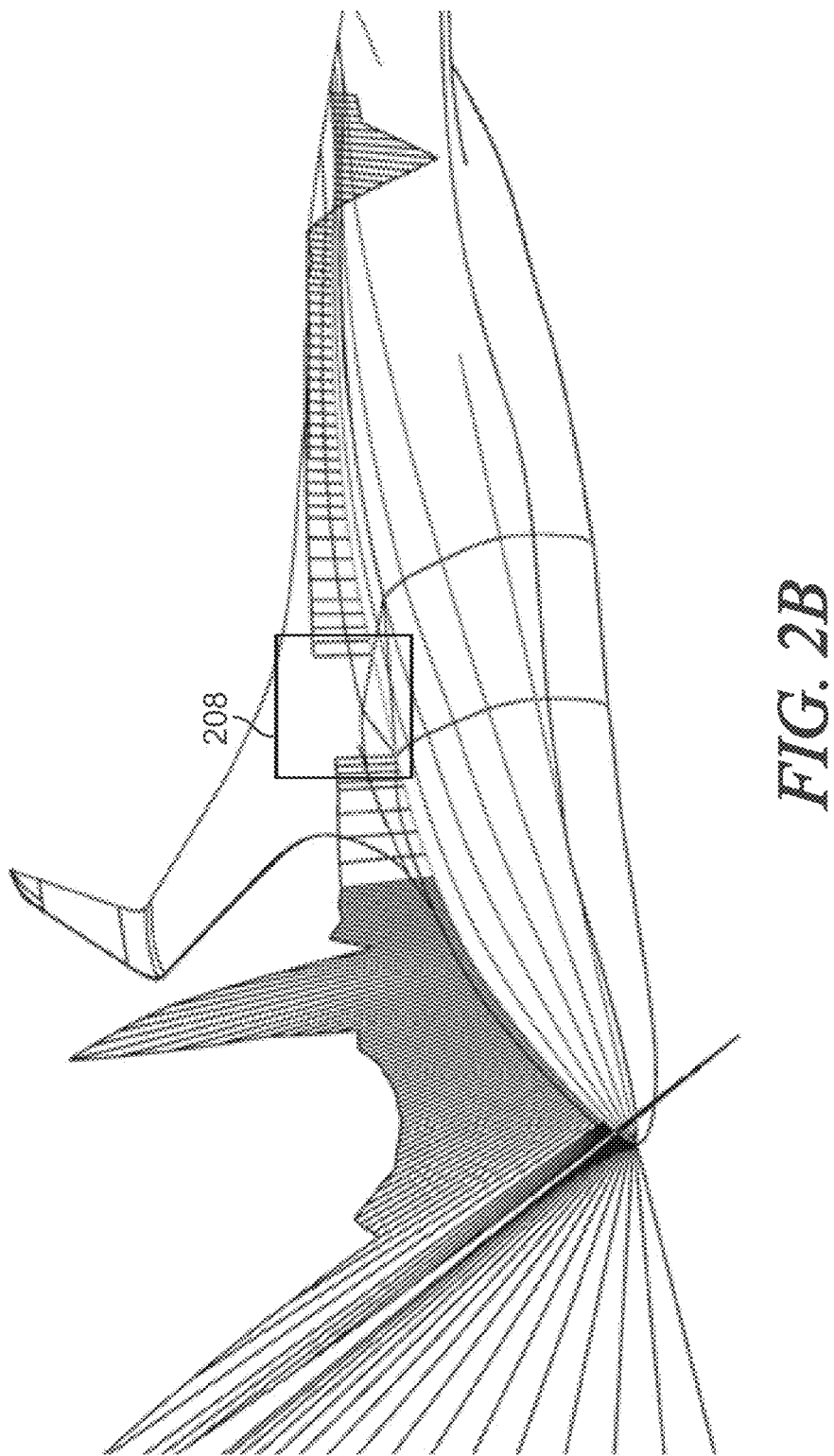
Figure 2C:
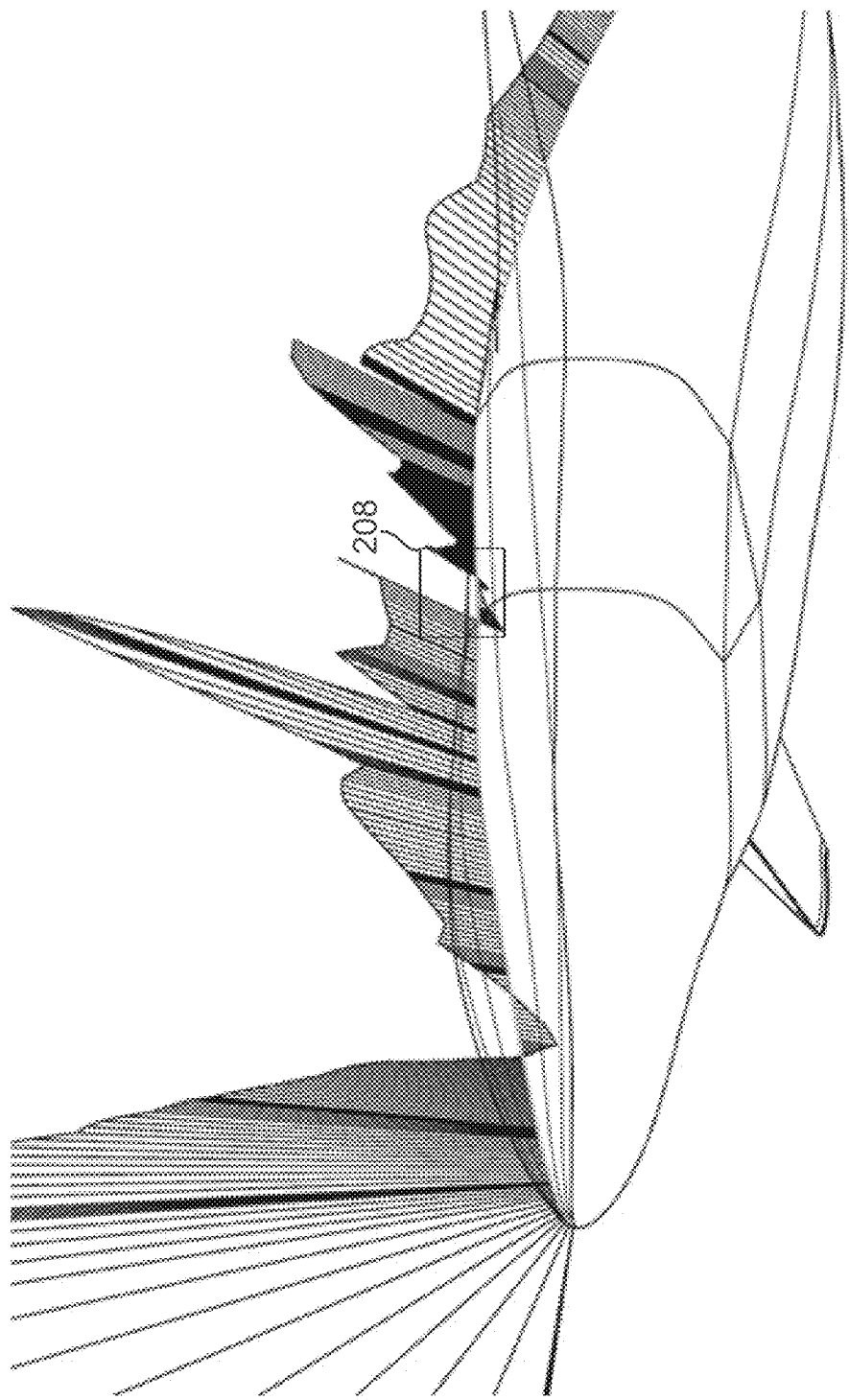

Now referring to FIG. 2A-C, exemplary embodiments for checking a curvature of expansion component 120 with flat-wrap scheme are illustrated. In an embodiment, once expansion component 120 is inserted between plurality of common components 104*a-d* to form a new modular BWB aircraft, computation fluid dynamics (CFD), aside from wind tunnel or flight testing, may be used to check the quality of expansion component 120. Computing device may be used to perform calculations required to simulate the interaction of fluids (i.e., airflow) with surfaces (i.e., OML) defined by boundary conditions. CFD may provide a most definitive evaluation of new modular BWB aircraft's shape; however, CFD analysis may be labor or computer intensive. In some cases, CFD may be applied during design process to evaluate expansion component 120. Exemplary evaluations are described in further detail below.

Now referring to FIG. 2A, an exemplary embodiment of a plurality of simulated surface streamlines of modular BWB aircraft 100 with expansion component 120 having flat-wrap center band 152 is illustrated. The interaction between aerodynamic flow and a surface may occur along a plurality of surface streamlines 204, wherein the "surface streamlines," for the purpose of this disclosure, are imaginary lines that represent the flow of a fluid over a surface. In an embodiment, plurality of surface streamlines 204 may be provided directly by CFD. In a non-limiting example, plurality of surface streamlines 204 may be emanated from a point forward of nose structure 104*a* and projected aft onto modular BWB aircraft's 100 OML. Each surface streamline of plurality of surface streamlines 204 may be a path traced by a particle moving with an airflow, providing a representation of the fluid behavior (e.g., flow direction, flow pattern, and/or the like) of airflow on modular BWB aircraft's 100 OML.

Now referring to FIG. 2B, an exemplary centerline curvature plot is illustrated. In some cases, a 3D computer-aided design (CAD) software may be used to evaluate curvature and slope of one or more curves of modular BWB aircraft 100. In a non-limiting example, RHINO CAD may provide a tool configured to create a "comb" plot of lines emanating from a selected surface streamline (e.g., centerline 112). The length of lines may be proportional to curvature (inverse of radius); for instance, and without limitation, a straight line having a length of zero may include an infinite radius and zero curvature. On the other hand, a straight line having a relative longer length may include a smaller radius. As illustrated in FIG. 2B, a relatively smooth variations in curvature along centerline 112 except for the abrupt change at connecting surface 160 (this is because the connecting surface 160 for flat-wrap center band 152 of expansion component 120 may be a planar surface having no curvature; therefore, the length for lines at connecting surface 160 is zero). Zero curvature across connecting surface 160 may be an inevitable consequence of flat-wrap center band 152.

Now referring to FIG. 2C, an exemplary outboard surface streamline curvature plot is illustrated. At the aft collar edge 140, a slop discontinuity 208 (as shown by divergence in plot's comb line) may be apparent for flat wrapped collar surface of collar 124.

With continued reference to FIGS. 2A-C, such flat wrapped surface may be contrasted with a compound surface for which there is no way to embed a straight line. In an embodiment, flat wrapped surface may include a surface formed by two curves that are linked by a plurality of straight lines, wherein each straight line of the plurality of straight lines may connect to curves at points of equal slope; For instance, and without limitation, flat wrapped surface may include two circles connected by plurality of straight lines at same angle (or "hour") to form a cylinder straight lines. These can connect at the same angle (or "hour") to form a cylinder, while compound surface may include two circles connected in 90° out of phase. Such compound surface may not be wrapped with flat wrapped surface. In the case of expansion component 120 having flat wrapped surfaces, surfaces such as flat wrapped collar surface and flat-wrap center band may be formed by plurality of straight lines connecting like points on left aft edge 108a of nose structure 104a and left forward edge 156a of left wing structure 104b, and right aft edge 108b of nose structure 104a and right forward edge 156b of right wing structure 104c. It should be noted, any set of parallel cuts (i.e., cross sections) through the collar 124 of expansion component 120 may yield a same shape. Such characteristic may be advantageous for modular BWB aircraft 100 design. In a non-limiting example, expansion component 120 having flat wrapped surfaces may enable common or geometrically common structural elements to support flat wrapped surfaces. Additionally, expansion component 120 having flat wrapped surface may enable one or more common windows/openings (i.e., doors). to be placed in leading edge 116, e.g., all of the common windows/doors in the flat wrap section may have the same shape, assuming that all common windows are all located at the same point on the cross-section curve. A similar argument may apply to interior furnishings and fittings as well.

Still referring to FIGS. 2A-C, in another embodiment, collar 124 of expansion component 120 having flat wrapped surfaces may include straight lines that are parallel to leading edge 116. Such configuration may simplify the manufacture of expansion component 120. Additionally, upper and lower surfaces (i.e., flat-wrap center band 152) of central width body 128 may also be formed by straight lines, assuming that straight lines are parallel with the lateral axis (Y-axis. Such configuration may simplify the design and manufacture of ceiling and floor beams of modular BWB aircraft 100. In a non-limiting example, upper and lower skins of central width body 128 may be supported by ribs that bound the longitudinal cabins. In case of the two-bay aircraft (i.e., modular BWB aircraft without expansion component 120), two outboard ribs and a center rib may be used to support upper and lower skins. When expansion component 120 is inserted, modular BWB aircraft 100 may be enlarged to a three-bay design, wherein center rib may be nominally discarded, and two new ribs are added to bound the central cabin. With the flat-wrap scheme, the two new ribs of the new three-bay aircraft may be in the same shape as the discarded central rib of the original two-bay aircraft, e.g., new ribs may have much in common with the old central rib; therefore flat-wrap scheme may benefit tooling and manufacturing of modular BWB aircraft with expansion component 120.

Still referring to FIGS. 2A-C, it should be noted that, flat-wrap scheme may result in important aerodynamic flaws in the shape of the enlarged modular BWB aircraft's OML. In a non-limiting example, upper centerline may include one or more discontinuities in slope and curvature at the junction of nose structure 104a and connecting surface 160, and at connecting surface 160 and central width body 128: the rate of change of curvature is infinite at these junctions as described above with reference to FIG. 2B. In another non-limiting example, other surface streamlines that cross collar 124 of expansion component 120 having flat wrapped collar surface may be include one or more slope and curvature discontinuities as these surface streamlines enter and leave collar 124 as described with reference to FIG. 2C. In some cases, severity of the penalties of such aerodynamic flows may depend in part on the location of left aft edge 108a/left forward edge 156a and right aft edge 108b/right forward edge 156b. In an embodiment, modular BWB aircraft 100 (having two-bay without expansion component 120) may be modified from the initial shape to diminish aerodynamic flows described herein: the high point of centerline 112 may be aligned with the locations of left aft edge 108a/left forward edge 156a and right aft edge 108b/right forward edge 156b, thereby eliminating slope discontinuity on centerline 112; however, curvature discontinuity may still remain, and the ideal aerodynamic OML may be compromised. Alternatively, nose structure 104a may be adjusted vertically with respect to at least two wing structures 104b-c, thereby aligning nose structure 104a and centerline 112 with connecting surface 160; however, curvature discontinuity may still remain.

With further continued reference to FIGS. 2A-C, inserting expansion component 120 with flat-wrap scheme between plurality of common components 104a-d may diminish ability of forward camber to balance nose-down moment as modular BWB aircraft grows in capacity. Forward chamber may be configured to stabilize modular BWB aircraft 100 during pitch (alternative to automated stability system). Such pitch stability characteristics may be introduced by configuring CG ahead of aerodynamic center (AC) of modular BWB aircraft; however, such configuration of CG may imply nose-down moment (i.e., rotational force or moment that causes aircraft's nose or front end to rotate downward). AC is a point on aircraft's longitudinal axis about which pitching moment is invariant with angle of attack. Nose-down movement may be trimmed (i.e., balanced) by aerodynamic forces, e.g., by reflexing the trailing edge of at least two wing structures 104b-c upwards. In level cruise flight, as cabin's angle of attack increases, the deck angle (i.e., pitch attitude of aircraft with respect to horizontal plane) of cabin increases; thus, modular BWB aircraft 100 enlarged by expansion component 120 with flat-wrap scheme may fly at a greater deck angles as an unfavorable result. Such limitation may be addressed with a curved-wrap scheme as described below in further detail.

Figure 3A:
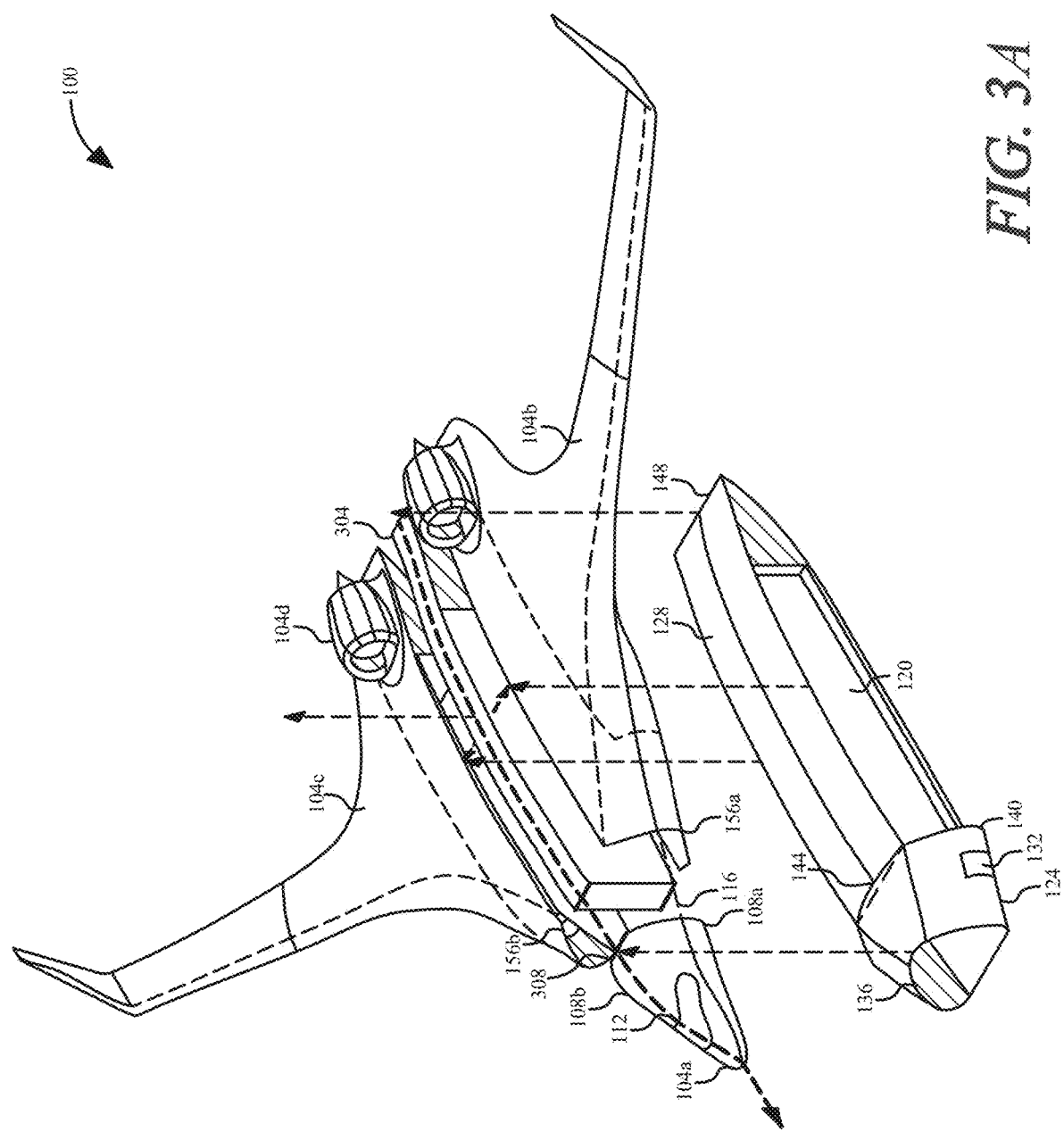
FIG. 3A-B are diagrams showing exemplary embodiments of divisions of plurality of common components.

Now referring to FIG. 3A, an exemplary embodiment of divisions of plurality of common components that compliant with expansion component 120 having a curved-wrap scheme is illustrated. In an embodiment, modular BWB aircraft 100 may include an initial center band 304, wherein nose structure 104a may further include a center aft edge 308 joined to initial center band 304, and wherein left wing structure 104b may be joined with initial center band 304 and left aft edge 108a on the left side and right wing structure 104c may be joined with initial center band 304 and right aft edge 108b on the right side. In some cases, the width of initial center band, or the length of center aft edge 308 of nose structure 104a may be two passenger seats wide. In a non-limiting example, at least two wing structures 104b-c may be separated, outboard one passenger seat wide of centerline 112. In this cases, there may be some slope at points where at least two wing structures 104b-c are joined with initial center band 304 (if there were no width to initial center band 304, similar to flat-warp scheme, the slop of the cross section may be zero at a point where left wing structure 104b is joined with right wing structure 104c). Separating plurality components 104a-c may include moving nose structure 104a forward. Initial center band 304 may be discarded after the separation.

Figure 3B:
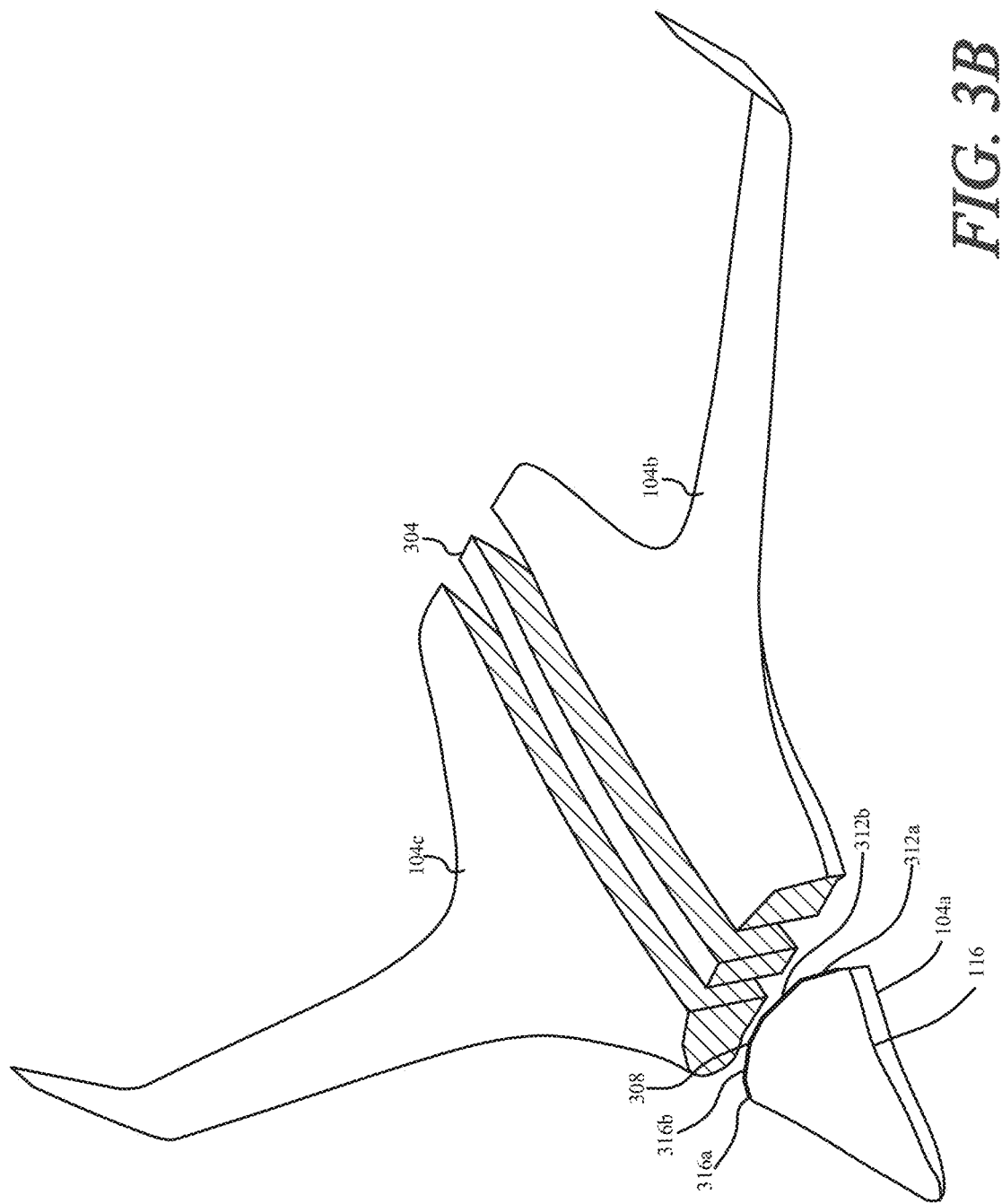

Now referring to FIG. 3B, an exemplar embodiment of an alternative method for separating plurality of common components 104a-c is illustrated. In some cases, left aft edge 108a and/or right aft edge 108b of nose structure 104a may include a plurality of edges. In a non-limiting example, plurality of aft edges may be configured to form a polygonal shape at the back of nose structure 104a. A first left aft edge 312a of plurality of left aft edges may intersect with leading edge 116 on left side of initial center band 304 and a second left aft edge 312b of plurality of left aft edges may intersect with center aft edge 308 from left side, wherein the first left aft edge 312a and the second left aft edge 312b may be directly connected or connected by one or more other left aft edges. Similarly, a first right aft edge 316a of plurality of right aft edges may intersect with leading edge 116 on right side of initial center band 304 and a second right aft edge 316b of plurality of right aft edges may intersect with center aft edge 308 from left side, wherein the first right aft edge 316a and the second right aft edge 316b may be directly connected or connected by one or more other right aft edges. Second left aft edge may be connected with second right aft edge. Each left aft edge of plurality of left aft edges may be symmetrical to each right aft edge of plurality of right aft edges according to initial center band 304. Additionally, Now referring to FIG. 4, an exemplary embodiment of an expansion component with curved-wrap scheme is illustrated. In some cases, central width body 128 may include a curved-wrap center band 404. As used in this disclosure, a "curved-wrap center band" is a compound structural element that wraps around the central width body 128. In a non-limiting example, curved-wrap center band 404 may include a compound surface configured to join left wing structure 104b on one side and right wing structure 104c on another side, wherein the compound surface may provide an improved slope and curvature continuity. In an embodiment, curved-wrap center band 404 may reduce the depth of the center band in enlarged modular BWB aircraft 100. In some cases, curved-warp center band 404 may include a concavity on upper OML as the slope of front central width body edge 144 starts at zero, increases to an inflection point, decreases and then goes to zero at centerline 112.

Figure 4:
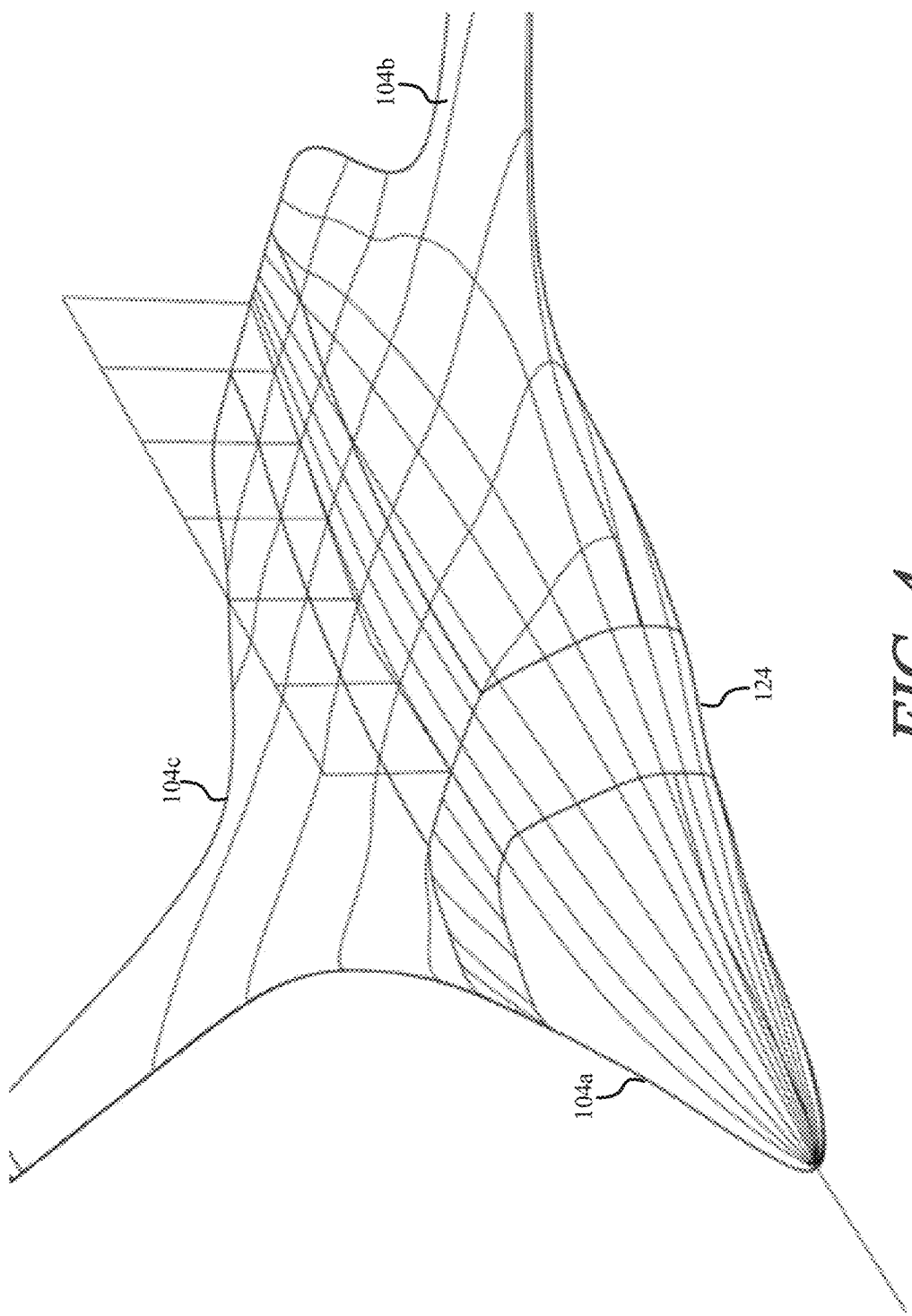
FIG. 4 is a diagram shows an exemplary embodiment of an expansion component with curved-wrap scheme.

Still referring to FIG. 4, expansion component 120 with curved wrapped surfaces may include a redefined upper centerline. In an embodiment, centerline 112 may be projected onto nose structure 104a and the rest portion of centerline 112 may be redefined by a tangent (straight line) to centerline 112 extended generally aft from center aft edge 308 and a freehand line in centerline plane drawn generally forward from the center of tailing edge 148. In a non-limiting example, a conic section may be created as a function of straight line tangent to centerline 112 and freehand line, wherein a conic endpoints of the conic section may coincide with the forward (i.e., freehand) and aft line (i.e., tangent line) endpoints. Intersection of tangent line and freehand line may be an apex of conic section. A rho value, e.g., thickness-to-chord ratio or thickness ratio of the airfoil may be selected to form a conic curve, replacing upper centerline after center aft edge 308. persons skilled in the art, upon reviewing the entirety of this disclosure, will be aware of various rho value may be selected for redefining centerline as consistent with this disclosure. Compound surface of curved-wrap center band 404 may then be formed by a series of three longitudinal curves (i.e., curves connecting wing structure edges and redefined centerline). Such compound surface may be tangent at its lateral edges to wing structures' surface. It should be noted that, moving the location of center aft edge 308 forward at centerline 112 may increase the slope of tangent line, thereby providing a higher redefined centerline. Additionally, if a desired centerline crown (highpoint) location is to be achieved, increasing the slope of the tangent line may result in a steeper aft line as well. Additionally, or alternatively, curved-wrap center band 404 of central width body 128 may include a curved wrapped upper surface with a flat wrapped lower surface. Further, expansion component 120 may include a curved-wrap collar (i.e., collar 124 having compound surfaces) connecting to central width body 128. One or more compound surfaces of collar 124 may be shaped by a plurality of streamline blend curves simulated using CFD as described above with reference to FIGS. 2A-C.

Figure 5A:
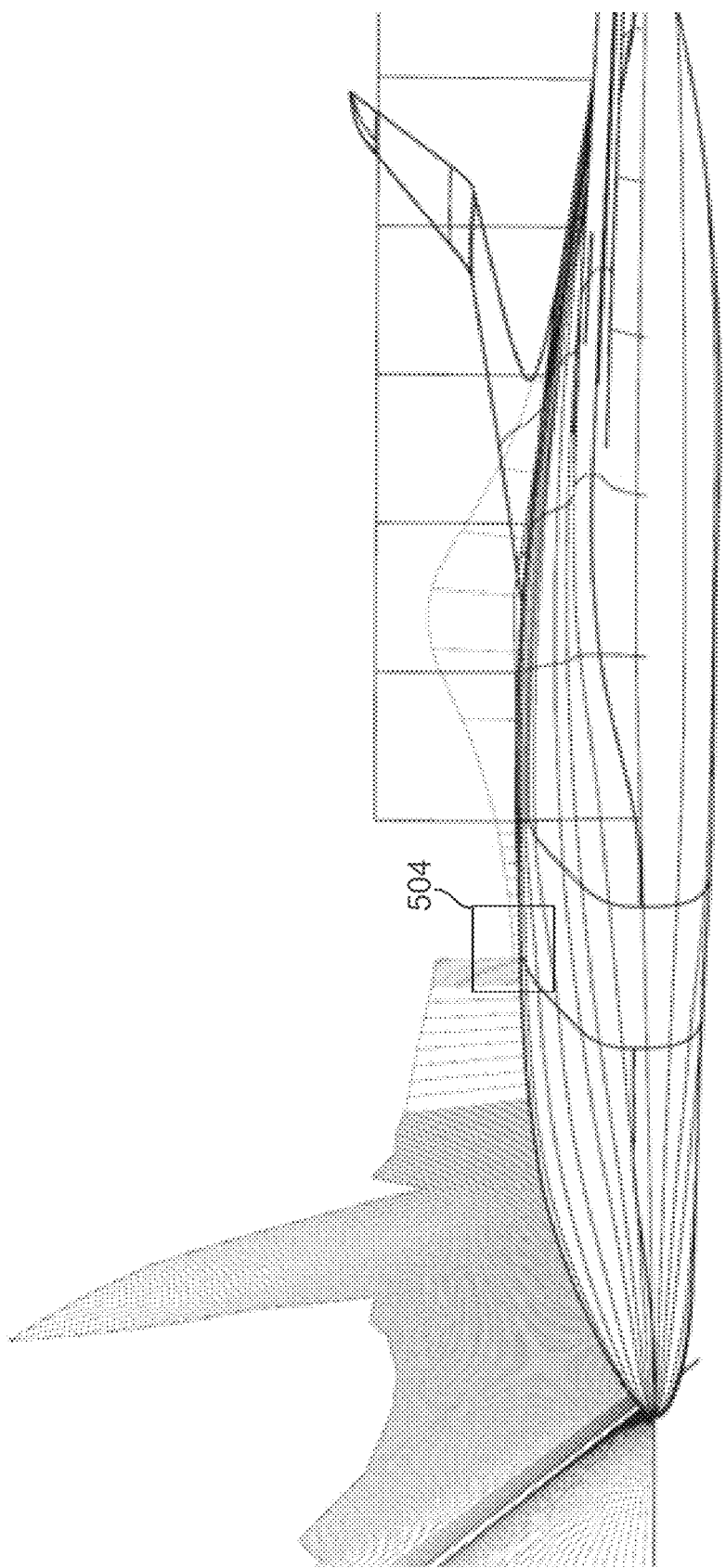
FIG. 5A-B are diagrams illustrating exemplary embodiments for checking a curvature of expansion component with curved-wrap scheme.
Figure 5B:
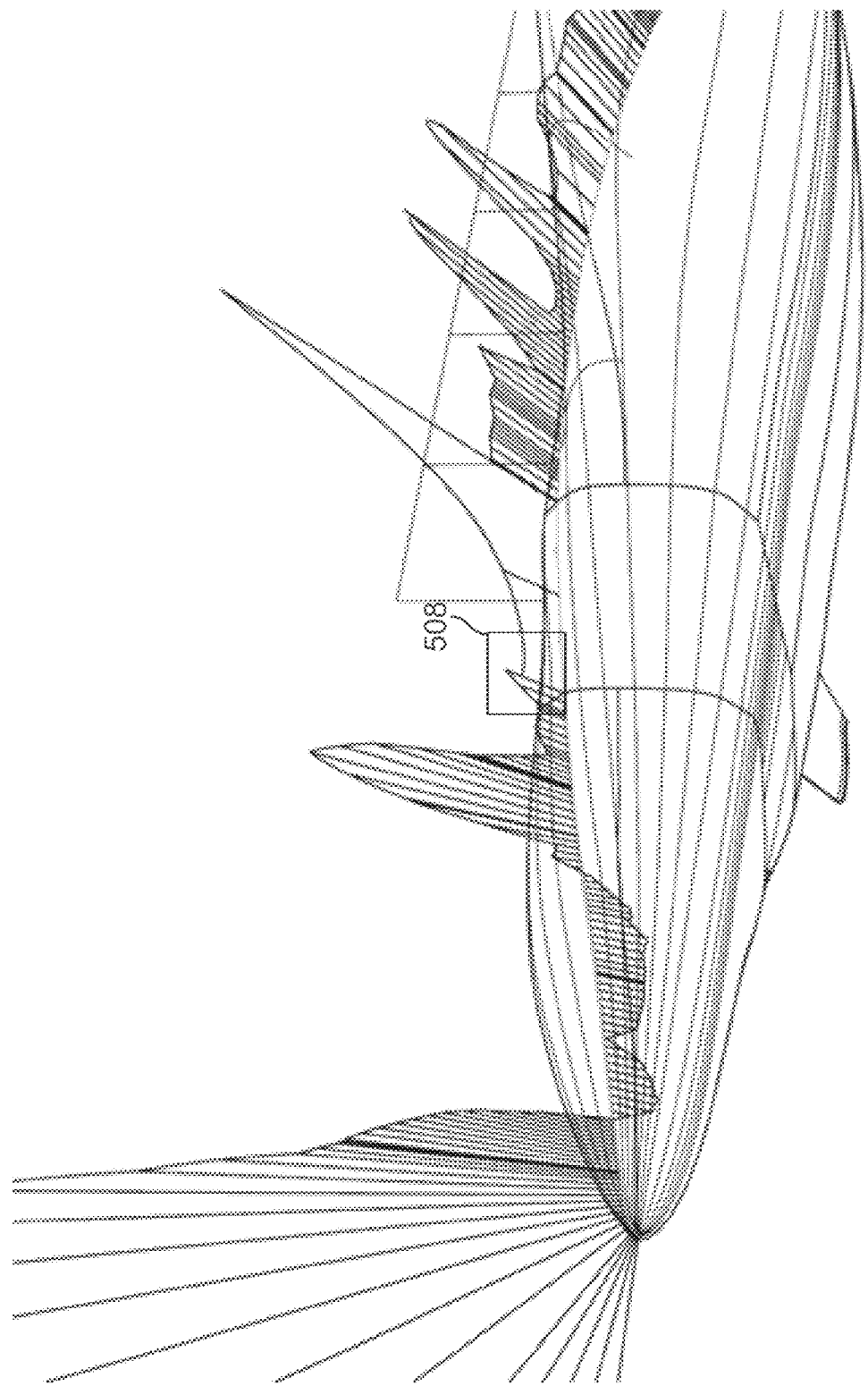

Now referring to FIG. 5A-B, exemplary embodiments for checking a curvature of expansion component 120 with curved-wrap scheme are illustrated. Method for checking curvature of expansion component 120 with curved-wrap scheme may be consistent with method used for checking curvature of expansion component 120 with flat-wrap scheme as described above with reference to FIGS. 2A-C. In some cases, curved wrapped collar's outboard surfaces may be tangent to surfaces of nose structure 104a and/or at least two wing structures 104b-c. It should be noted that, as shown in FIG. 5A, there may be a sharp discontinuity 504 in curvature at the junction of nose structure 104a and collar 124 with curved wrapped surface tangent to the surface of nose structure 104a. As shown in FIG. 5B, curved wrapped outboard collar surface constructed from tangent surface streamlines may include a weak curvature discontinuity 508 at the junction of nose structure 104a and collar 124; However, it may include a high curvature discontinuity at the junction of collar 124 and at least two wing structures 104b-c. In contrast with flat-wrap scheme described above, the slope at these junctions may be continuous (as indicated by the direction of the comb elements at the forward and aft collar junctions).

Figure 6A:
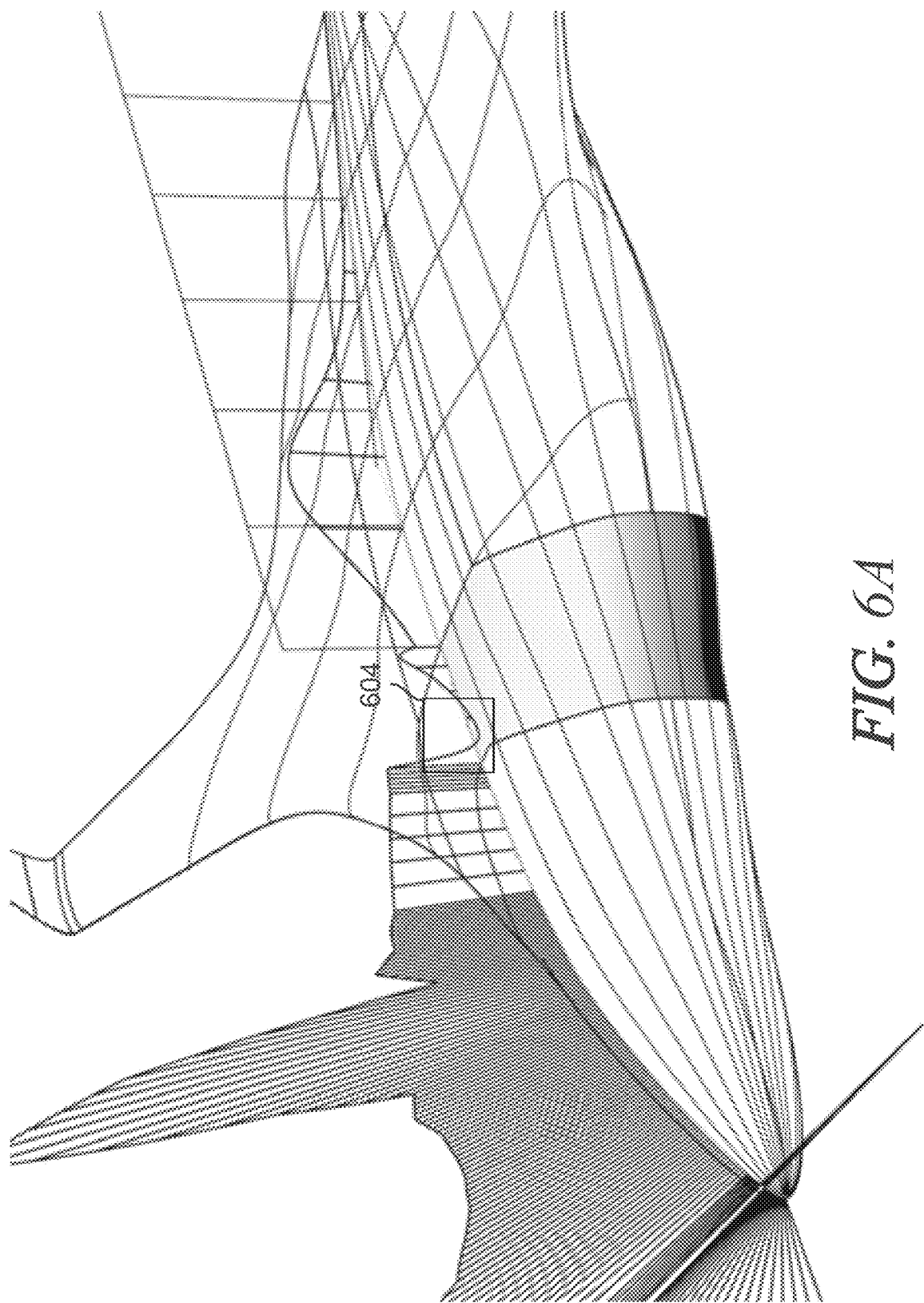
Figure 6B:
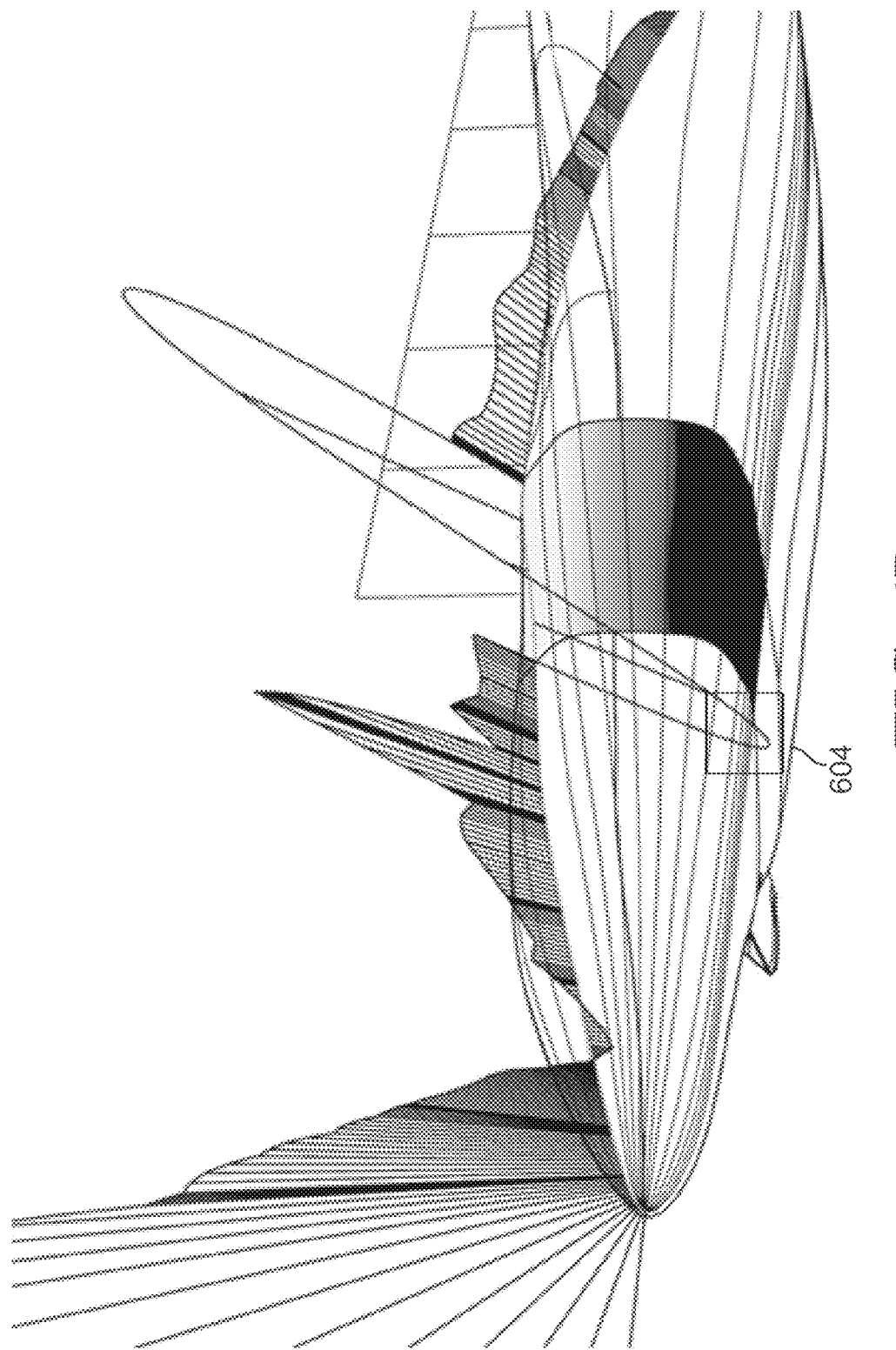

Now referring to FIG. 6A-C, exemplary embodiments for checking a curvature of a revised expansion component 120 with curved-wrap scheme are illustrated. Expansion component 120 may be revised, for example, and without limitation, by switching surface streamlines' constrain from one continuity (e.g., tangency) to another continuity. In a non-limiting example, same rate of curvature change of nose structure 104a and/or at least two wing structures 104b-c may be applied to surface streamlines on collar 124. Such collar 124 may include no curvature discontinuity. In some cases, the curvature shows an inflection point 604 with a concave region in the forward portion of revised collar and a more-convex portion near the rear portion.

Now referring to FIG. 7, a flow diagram of an exemplary method 700 for manufacturing a modular blended wing body (BWB) aircraft is illustrated. Method 700 includes a step 705 of receiving a plurality of common components containing a nose structure having a left aft edge and a right aft edge intersecting on a centerline of the BWB on one end and intersecting on a leading edge of the BWB on another end, and at least two wing structures having a left wing structure and a right wing structure, wherein the at least two wing structures are laterally symmetrical to the centerline. In some embodiments, left aft edge and the right aft edge may be orthogonal to the leading edge. This may be implemented, without limitation, as described above with reference to FIGS. 1-6.

With continued reference to FIG. 7, method 700 includes a step of 710 of attaching, the left wing structure of the at least two wing structures, arranged on the left side of the centerline, to the nose structure by attaching a left forward edge of the left-wing structure to the left aft edge. This may be implemented, without limitation, as described above with reference to FIGS. 1-6.

With continued reference to FIG. 7, method 700 includes a step 715 of attaching, the right wing structure of the at least two wing structures, arranged on the right side of the centerline, to the nose structure by attaching a right forward edge of the right-wing structure to the right aft edge. This may be implemented, without limitation, as described above with reference to FIGS. 1-6.

With continued reference to FIG. 7, method 700 includes a step 720 of attaching, the left-wing structure to the right-wing structure at the centerline, wherein there is no clear demarcation between the at least two wing structures and the nose structure of the plurality of common components of the BWB aircraft. This may be implemented, without limitation, as described above with reference to FIGS. 1-6.

With continued reference to FIG. 7, method 700 may further include a step of enlarging, by at least an expansion component having at least an expansion feature, the BWB as a function of the at least an expansion feature by inserting the at least an expansion component between the plurality of common components of the BWB relative to the centerline. In some embodiments, inserting the expansion component between the plurality of common components of the BWB may include moving the nose structure forward along the centerline without any vertical movement, moving the at least two wing structures outboard of the centerline, and inserting the at least an expansion component between the separated plurality of common components relative to the centerline. This may be implemented, without limitation, as described above with reference to FIGS. 1-6.

In some embodiments, and still referring to FIG. 7, at least an expansion component may include a collar attached the nose structure, wherein the collar may include a front collar edge and an aft collar edge, and a central width body connected to the collar, attached to the at least two wing structures, wherein the central width body may include a front central width body edge attached to the aft collar edge and a tailing edge of the BWB, and attaching the at least two wing structures may include attaching the left-wing structure to a left side of the central width body, and attaching the right-wing structure to the right side of the central width body. In some embodiments, enlarging the BWB using the at least an expansion component further may include retaining, by the at least an expansion component, a continuous outer mold line (OML) of the BWB when the at least an expansion component is inserted between the plurality of common components. In some cases, the central width body may include a flat-wrap center band. In other cases, the central width body may include a curved center band. This may be implemented, without limitation, as described above with reference to FIGS. 1-6.

With continued reference to FIG. 7, method 700 may further include a step of mechanically attaching, at least a propulsor to the at least two wing structures of the plurality of common components. In some embodiments the at least two wing structures may include at least a flight control surface configured to manipulate a fluid medium. This may be implemented, without limitation, as described above with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
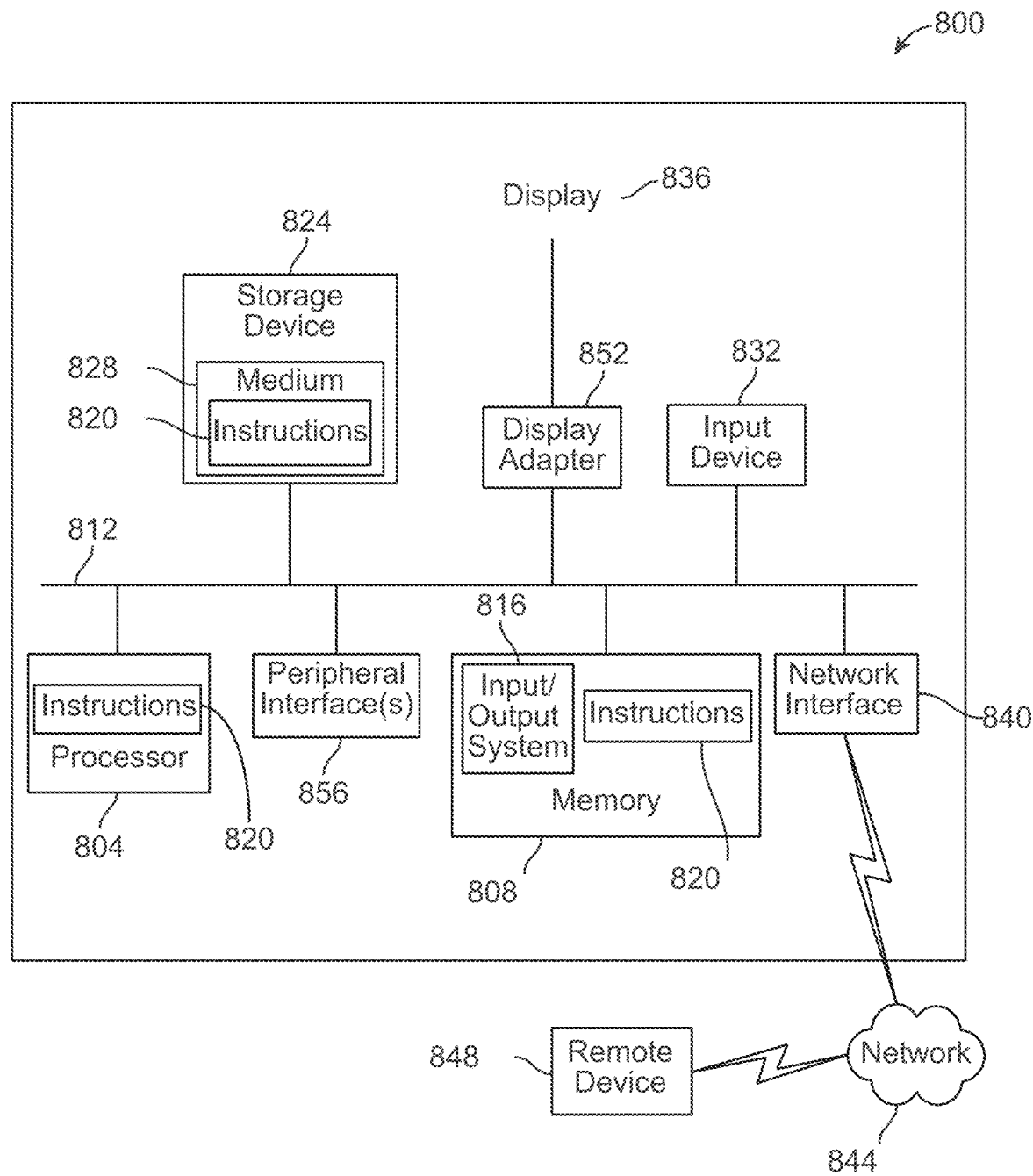
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A modular blended wing body (BWB) aircraft, the BWB comprising:
   a plurality of common components, wherein the plurality of common components comprises:
      a nose structure having a left aft edge and a right aft edge intersecting on a centerline of the BWB on one end and intersecting on a leading edge of the BWB on another end; and
      at least two wing structures attached to the nose structure, wherein:
         the at least two wing structures comprise:
            a left-wing structure arranged on a left side of the centerline, wherein the left-wing structure comprises a left forward edge; and
            a right-wing structure arranged on a right side of the centerline, wherein the right-wing structure comprises a right forward edge; and
            wherein the left-wing structure and the right-wing structure are laterally symmetrical to the centerline; and
         attaching the at least two wing structures to the nose structure comprises:
            attaching the left forward edge to the left aft edge;
            attaching the right forward edge to the right aft edge; and
            attaching the left-wing structure and the right-wing structure at the centerline;
         wherein there is no clear demarcation between the at least two wing structures and the nose structure of the plurality of common components of the BWB aircraft.

2. The BWB aircraft of claim 1, wherein the BWB comprises:
   at least an expansion component having at least an expansion feature, wherein the at least an expansion component is configured to:
      enlarge the BWB as a function of the at least an expansion feature by inserting the expansion component between the plurality of common components of the BWB relative to the centerline.

3. The BWB aircraft of claim 2, wherein inserting the expansion component between the plurality of common components of the BWB comprises:
   moving the nose structure forward along the centerline;
   moving the at least two wing structures outboard of the centerline; and
   inserting the at least an expansion component between the plurality of common components relative to the centerline.

4. The BWB aircraft of claim 2, wherein the at least an expansion component comprises:
   a collar attached the nose structure, wherein the collar comprises a front collar edge and an aft collar edge; and
   a central width body connected to the collar, attached to the at least two wing structures, wherein:
      the central width body comprises a front central width body edge attached to the aft collar edge and a tailing edge of the BWB; and
      attaching the at least two wing structures comprises:
         attaching the left-wing structure to a left side of the central width body; and
         attaching the right-wing structure to the right side of the central width body.

5. The BWB aircraft of claim 2, wherein the at least an expansion component is further configured to retain a continuous outer mold line (OML) of the BWB when inserted between the plurality of common components.

6. The BWB aircraft of claim 4, wherein the central width body comprises a flat-wrap center band.

7. The BWB aircraft of claim 4, wherein the central width body comprises a curved center band.

8. The BWB aircraft of claim 1, wherein the left aft edge and the right aft edge of the nose structure are orthogonal to the leading edge.

9. The BWB aircraft of claim 1, wherein the at least two wing structures comprise at least a flight control surface configured to manipulate a fluid medium.

10. The BWB aircraft of claim 1, wherein the plurality of common components comprises at least a propulsor mechanically attached to the at least two wing structures.

11. A method for manufacturing a modular blended wing body (BWB) aircraft, the method comprises:
   receiving a plurality of common components, wherein the plurality of common components comprises:
      a nose structure having a left aft edge and a right aft edge intersecting on a centerline of the BWB on one end and intersecting on a leading edge of the BWB on another end; and
      at least two wing structures having a left-wing structure and a right-wing structure, wherein the at least two wing structures are laterally symmetrical to the centerline;
   attaching, the left-wing structure of the at least two wing structures, arranged on a left side of the centerline, to the nose structure by attaching a left forward edge of the left-wing structure to the left aft edge;
   attaching, the right-wing structure of the at least two wing structures, arranged on a right side of the centerline, to the nose structure by attaching a right forward edge of the right-wing structure to the right aft edge; and attaching, the left-wing structure to the right-wing structure at the centerline, wherein there is no clear demarcation between the at least two wing structures and the nose structure of the plurality of common components of the BWB aircraft.

12. The method of claim 11, wherein the method comprises:
enlarging, by at least an expansion component having at least an expansion feature, the BWB as a function of the at least an expansion feature by inserting the at least an expansion component between the plurality of common components of the BWB relative to the centerline.

13. The method of claim 12, wherein inserting the expansion component between the plurality of common components of the BWB comprises:
moving the nose structure forward along the centerline;
moving the at least two wing structures outboard of the centerline; and
inserting the at least an expansion component between the plurality of common components relative to the centerline.

14. The method of claim 12, wherein the at least an expansion component comprises:
a collar attached the nose structure, wherein the collar comprises a front collar edge and an aft collar edge; and
a central width body connected to the collar, attached to the at least two wing structures, wherein:
the central width body comprises a front central width body edge attached to the aft collar edge and a tailing edge of the BWB; and
attaching the at least two wing structures comprises:
attaching the left-wing structure to a left side of the central width body; and
removable attaching the right-wing structure to the right side of the central width body.

15. The method of claim 12, wherein enlarging the BWB using the at least an expansion component further comprising:
retaining, by the at least an expansion component, a continuous outer mold line (OML) of the BWB when the at least an expansion component is inserted between the plurality of common components.

16. The method of claim 14, wherein the central width body comprises a flat-wrap center band.

17. The method of claim 14, wherein the central width body comprises a curved center band.

18. The method of claim 11, wherein the left aft edge and the right aft edge of the nose structure are orthogonal to the leading edge.

19. The method of claim 11, wherein the at least two wing structures comprise at least a flight control surface configured to manipulate a fluid medium.

20. The method of claim 11, wherein the method further comprises a step of:
mechanically attaching, at least a propulsor to the at least two wing structures of the plurality of common components.

* * * * *